US012066781B2

(12) United States Patent
Goto et al.

(10) Patent No.: US 12,066,781 B2
(45) Date of Patent: Aug. 20, 2024

(54) SHEET TRANSPORT DEVICE AND IMAGE FORMING APPARATUS

(71) Applicant: FUJIFILM BUSINESS INNOVATION CORP., Tokyo (JP)

(72) Inventors: Yasunobu Goto, Kanagawa (JP); Yoshinori Koike, Kanagawa (JP); Yoshiki Matsuzaki, Kanagawa (JP); Hirotake Eguchi, Kanagawa (JP); Kiyoshi Watanabe, Kanagawa (JP); Natsumi Nakata, Kanagawa (JP); Koji Deguchi, Kanagawa (JP); Nobuhiro Hiroe, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 153 days.

(21) Appl. No.: 17/944,636

(22) Filed: Sep. 14, 2022

(65) Prior Publication Data

US 2023/0314998 A1 Oct. 5, 2023

(30) Foreign Application Priority Data

Mar. 29, 2022 (JP) ................................ 2022-053715

(51) Int. Cl.

*B65H 29/70* (2006.01)
*B65H 5/06* (2006.01)
(Continued)

(52) U.S. Cl.

CPC ......... *G03G 15/6502* (2013.01); *B65H 5/062* (2013.01); *B65H 9/002* (2013.01);
(Continued)

(58) Field of Classification Search

CPC .... G03G 15/6502; B65H 5/062; B65H 9/002; B65H 2301/333; B65H 2301/361;
(Continued)

(56) References Cited

U.S. PATENT DOCUMENTS 6,059,285 A * 5/2000 Suga ...................... B65H 9/006 271/228
7,540,496 B2 * 6/2009 Fukushima ............ B65H 9/002 271/253
(Continued)

FOREIGN PATENT DOCUMENTS

JP 2008-001473 A 1/2008
JP 2019-147663 A 9/2019

*Primary Examiner* — Leslie A Nicholson, III
(74) *Attorney, Agent, or Firm* — Oliff PLC

(57) ABSTRACT

A sheet transport device includes a pair of movable transport rollers capable of transporting a sheet while holding the sheet and moving in an axial direction crossing a transportation direction; pairs of first transport rollers upstream from the pair of movable transport rollers in the transportation direction while being spaced apart from each other to transport the sheet while holding the sheet; and pairs of transport guides to define sheet transport spaces between the pair of movable transport rollers and the pairs of first transport rollers and between the pairs of first transport rollers. When the pair of movable transport rollers is to be moved in the axial direction, at least one pair of first transport rollers transports the sheet while bending the sheet in the transport space by producing a difference in transport rate within a portion of a section upstream from the pair of movable transport rollers.

20 Claims, 27 Drawing Sheets

(51) Int. Cl.
*B65H 9/00* (2006.01)
*G03G 15/00* (2006.01)

(52) U.S. Cl.
CPC .. *B65H 2301/333* (2013.01); *B65H 2301/361* (2013.01); *B65H 2404/1424* (2013.01); *B65H 2404/144* (2013.01)

(58) Field of Classification Search
CPC .... B65H 2301/5121; B65H 2404/1371; B65H 2404/1424; B65H 2404/144
USPC .................................. 271/184, 225, 272, 273
See application file for complete search history.

(56) References Cited

U.S. PATENT DOCUMENTS

| | | | | |
|---|---|---|---|---|
| 7,607,660 | B2 * | 10/2009 | Inoue | B65H 9/002 271/227 |
| 7,753,370 | B2 | 7/2010 | Inoue | |
| 8,366,104 | B2 * | 2/2013 | Sato | B65H 23/038 271/226 |
| 8,678,382 | B2 * | 3/2014 | Deno | B65H 7/08 271/228 |
| 8,851,470 | B2 * | 10/2014 | Matsumoto | B65H 7/02 271/228 |
| 9,022,384 | B2 * | 5/2015 | Hasegawa | B65H 9/002 271/245 |
| 9,776,818 | B2 * | 10/2017 | Hamaya | G03G 15/6564 |
| 10,011,447 | B2 * | 7/2018 | Nakamura | B65H 9/16 |

* cited by examiner

SHEET TRANSPORT DEVICE AND IMAGE FORMING APPARATUS

CROSS-REFERENCE TO RELATED APPLICATIONS

This application is based on and claims priority under 35 USC 119 from Japanese Patent Application No. 2022-053715 filed Mar. 29, 2022.

BACKGROUND

(i) Technical Field

The present disclosure relates to a sheet transport device and an image forming apparatus.

(ii) Related Art

Japanese Unexamined Patent Application Publication No. 2008-1473 (Claims 1 and 2, and FIG. 2) describes a sheet transport device that includes a skew corrector that corrects skewing of a sheet by rotating the sheet while transporting the sheet, a crosswise registration corrector that is disposed downstream from the skew corrector to be movable in a direction perpendicular to the sheet transportation direction to correct the sheet position in the direction perpendicular to the sheet transportation direction, and an auxiliary sheet transport portion that is disposed upstream from the skew corrector to be movable in a direction perpendicular to the sheet transportation direction.

In the sheet transport device described in Japanese Unexamined Patent Application Publication No. 2008-1473 (Claims 1 and 2, and FIG. 2), when the crosswise registration corrector performs position correction by moving the sheet in a direction perpendicular to the sheet transportation direction after the skew corrector performs sheet skewing correction, the auxiliary sheet transport portion moves in the same direction as the crosswise registration corrector in synchronization with the crosswise registration corrector.

The sheet skew corrector described in Japanese Unexamined Patent Application Publication No. 2008-1473 (Claims 1 and 2, and FIG. 2) includes two pairs of sheet transport rotators independently disposed on a line perpendicular to the sheet transportation direction, and corrects sheet skewing using a difference in the sheet transport rate between the pairs of transport rotators. After the sheet skewing correction, the pairs of sheet transport rotators are released from pressure contact.

Japanese Unexamined Patent Application Publication No. 2019-147663 (Claim 1 and FIG. 1) describes a sheet transport device including two pairs of clamp transport members capable of transporting sheets while holding the sheets and capable of moving in the width direction perpendicular to the transportation direction.

The sheet transport device described in Japanese Unexamined Patent Application Publication No. 2019-147663 (Claim 1 and FIG. 1) moves one of the sheets in the width direction while holding the sheet with the two pairs of clamp transport members, and after moving in the width direction, separates, from each other, the two clamp transport members forming an upstream one of the two pairs of clamp transport members disposed upstream in the transportation direction, and transports the sheet with a downstream one of the two pairs of clamp transport members disposed downstream in the transportation direction.

SUMMARY

Aspects of non-limiting embodiments of the present disclosure relate to a sheet transport device and an image forming apparatus that, when moving, in an axial direction crossing a sheet transportation direction, one or more pairs of movable transport rollers movable in the axial direction, further reduce skewing or distortion of a portion of a sheet passing one or more of multiple pairs of transport rollers disposed upstream from the pair of movable transport rollers in the transportation direction while being spaced apart from each other, than in a case where the multiple pairs of transport rollers transport a sheet without causing a difference in the transport rate between the transport rollers or by pulling a sheet toward the respective transport rollers.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a sheet transport device including a pair of movable transport rollers capable of transporting a sheet while holding the sheet and capable of moving in an axial direction crossing a transportation direction; pairs of first transport rollers disposed upstream from the pair of movable transport rollers in the transportation direction while being spaced apart from each other to transport the sheet while holding the sheet; and pairs of transport guides disposed to define sheet transport spaces between the pair of movable transport rollers and the pairs of first transport rollers and between the pairs of first transport rollers, wherein, when the pair of movable transport rollers is to be moved in the axial direction, at least one of the pairs of first transport rollers transports the sheet while bending the sheet in the transport space by producing a difference in transport rate within a portion of a section upstream from the pair of movable transport rollers.

BRIEF DESCRIPTION OF THE DRAWINGS

Exemplary embodiments of the present disclosure will be described in detail based on the following figures, wherein.

DETAILED DESCRIPTION

Embodiments of the present disclosure will be described below with reference to the drawings.

First Exemplary Embodiment

Figure 1:
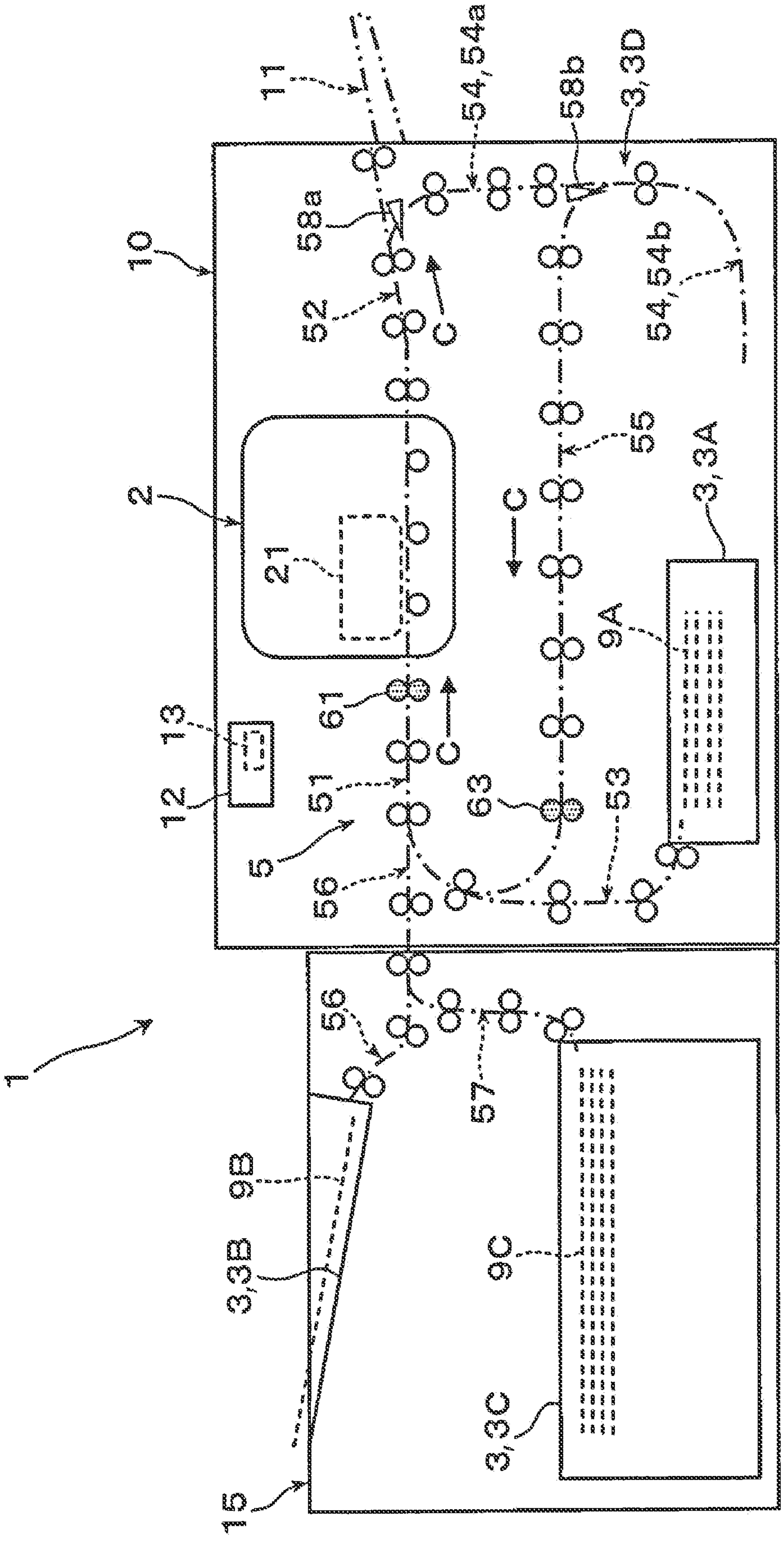
FIG. 1 is a schematic diagram of a sheet transport device and an image forming apparatus according to a first exemplary embodiment.
Figure 2:
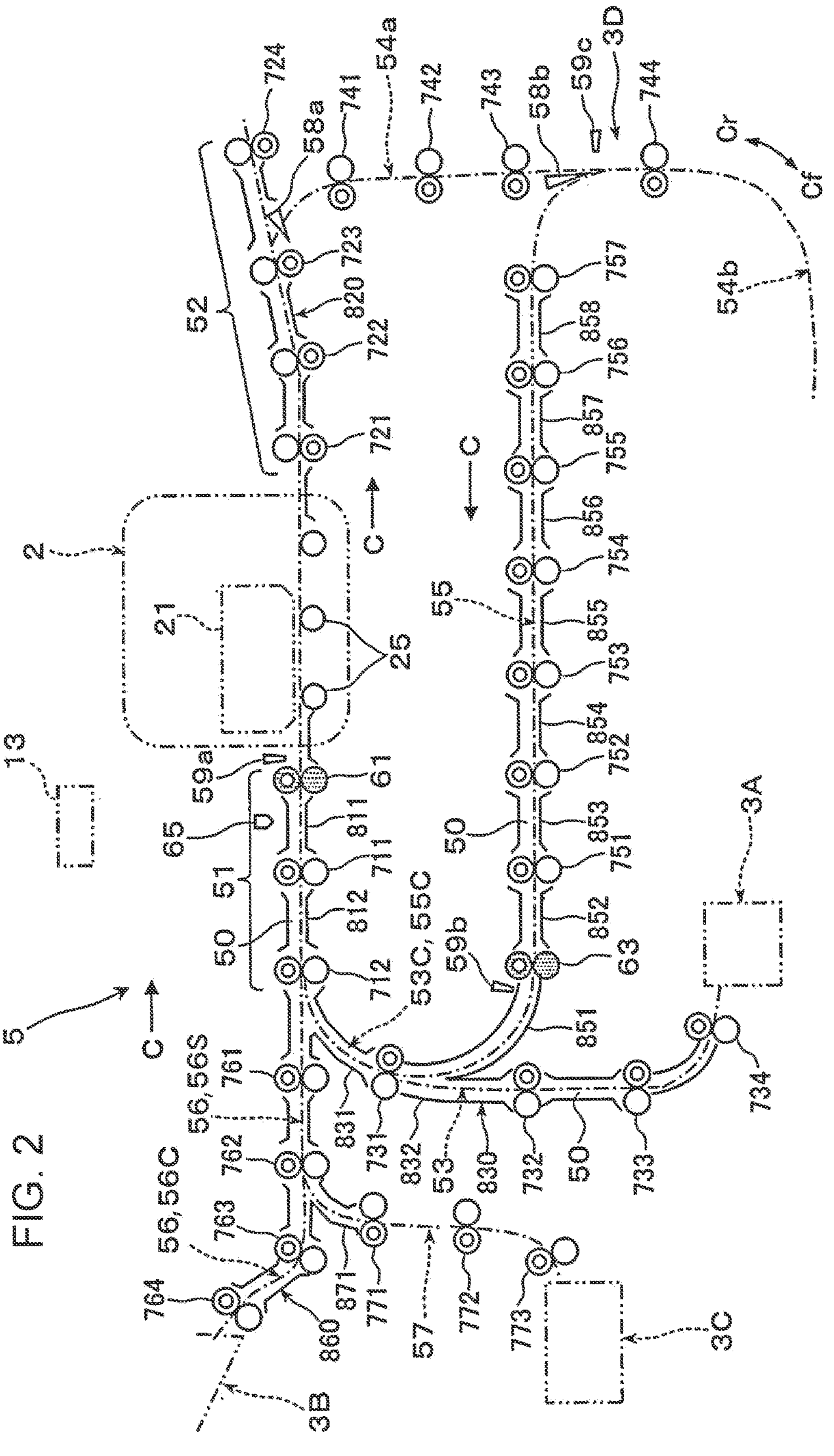
FIG. 2 is a schematic diagram of a sheet transport device used as the image forming apparatus illustrated in FIG. 1.

FIG. 1 is a schematic diagram of a sheet transport device 5 and an image forming apparatus 1 according to a first exemplary embodiment. FIG. 2 is a schematic diagram of the sheet transport device 5 included in the image forming apparatus 1.

Image Forming Apparatus

As illustrated in FIG. 1, the image forming apparatus 1 includes transportation start portions 3 from which sheets 9 are transported, an image forming portion 2 that forms an image on each sheet 9, and a sheet transport device 5 that transports the sheets from each transportation start portion 3 to the image forming portion 2.

The sheets 9 are media having a sheet shape, are transportable by the sheet transport device 5, and allow images formed thereon by the image forming portion 2.

More specifically, as illustrated in FIG. 1, the image forming apparatus 1 includes a body 10 and an add-on portion 15.

The body 10 has a housing with a predetermined shape. The body 10 includes, inside the housing, components such as the image forming portion 2, a first feeder 3A serving as an example of the transportation start portions 3, a final transport path 51, a discharging path 52, a first transport path 53, a reversal path 54, a re-transport path 55, part of a second transport path 56, and a control device 12. The final transport path 51, the discharging path 52, the first transport path 53, the reversal path 54, the re-transport path 55, and part of the second transport path 56 form the sheet transport device 5. At a side of the housing of the body 10, a discharging portion 11 is disposed to accommodate the discharged sheet 9. An operation portion or other components not illustrated are disposed at an upper portion or a front portion of the housing of the body 10.

The add-on portion 15 has a housing with a predetermined shape and is coupled to a side of the body 10. The add-on portion 15 includes, at an upper portion of the housing, a second feeder 3B serving as another example of the transportation start portions 3. The add-on portion 15 includes, inside the housing, components such as a third feeder 3C serving as another example of the transportation start portions 3, and the second transport path 56 and a third transport path 57 forming the sheet transport device 5.

The image forming portion 2 has a function of forming an intended image on each sheet 9. The image may be of any type or may have any material or other characteristics as long as the image is allowed to be formed on the sheet 9. For example, the image may be formed on the sheet 9 in the form of a plane.

In the first exemplary embodiment, for example, the image forming portion 2 forms images with a developer with, for example, an electrophotographic system.

Although not illustrated, the image forming portion 2 using, for example, the electrophotographic system includes, for example, an image carrier such as a photoconductor, a charging device that electrically charges the image carrier, and an image exposure device that exposes the charged image carrier to light to form an electrostatic latent image. Although not illustrated, the image forming portion 2 includes, for example, a developing device that develops the electrostatic latent image on the image carrier with a developer to form an unfixed developer image, a transfer device that directly or indirectly transfers the developer image on the image carrier to the sheet 9, and a fixing device that fixes the unfixed developer image transferred to the sheet 9 onto the sheet 9.

The image forming portion 2 includes an image transfer portion 21 that transfers the image formed by the image forming portion 2 to the sheet 9. As illustrated in FIG. 2, the image forming portion 2 also includes, for example, transport guides not illustrated and transport support rollers 25 that introduce the sheet 9 to the image transfer portion 21 and allow the sheet 9 to pass thereby.

The image forming apparatus 1 transfers an image to the sheet 9 transported by the sheet transport device 5 when the sheet 9 passes through the image transfer portion 21.

Each transportation start portion 3 accommodates and feeds the sheets 9 to be transported.

In the first exemplary embodiment, for example, the first feeder 3A, the second feeder 3B, and the third feeder 3C are used as examples of the transportation start portions 3. Examples of the transportation start portions 3 also include a sheet inverter 3D formed from the reversal path 54, described later.

The first feeder 3A includes components such as a container that accommodates a pile of sheets 9A with a predetermined type and a predetermined size, and a discharging device that discharges the sheets 9A one by one from the container. The second feeder 3B includes components such as a mount portion that receives sheets 9B with a predetermined type and a predetermined size, and a discharging device that discharges the sheets 9B one by one from the mount portion. The third feeder 3C includes components such as a container that accommodates a pile of sheets 9C with a predetermined type and a predetermined size, and a discharging device that discharges the sheets 9C one by one from the container.

The sheets 9A, 9B, and 9C differ in type or size from each other, but any two or all of the sheets 9A, 9B, and 9C may be the same in type or size.

Sheet Transport Device

As illustrated in FIG. 1 or 2, the sheet transport device 5 has a function of feeding the sheets 9 of the type and the size usable by the image forming portion 2 from each transportation start portion 3 to transport the sheets 9 to the image forming portion 2 or another intended location.

The sheet transport device 5 according to the first exemplary embodiment includes components such as the final transport path 51, the discharging path 52, the first transport path 53, the reversal path 54, the re-transport path 55, the second transport path 56, and the third transport path 57.

The final transport path 51 is a path along which the sheets 9 are transported to be finally fed to the image forming portion 2 while the timing to feed the sheets 9 to the image forming portion 2 is adjusted or the transport angle of the sheets 9 is corrected.

The final transport path 51 includes components such as a pair of movable transport rollers 61, multiple pairs of first transport rollers 711 and 712, and multiple pairs of transport guides 811 and 812. The rollers in each pair rotate while forming a portion where they are in contact with each other to transport each sheet 9 while holding the sheet 9. The final transport path 51 according to the first exemplary embodiment extends substantially straight.

The pair of movable transport rollers 61 is a pair of transport rollers capable of transporting the sheet 9 while holding the sheet 9, and capable of moving in an axial direction D crossing a transportation direction C.

Figure 3A:
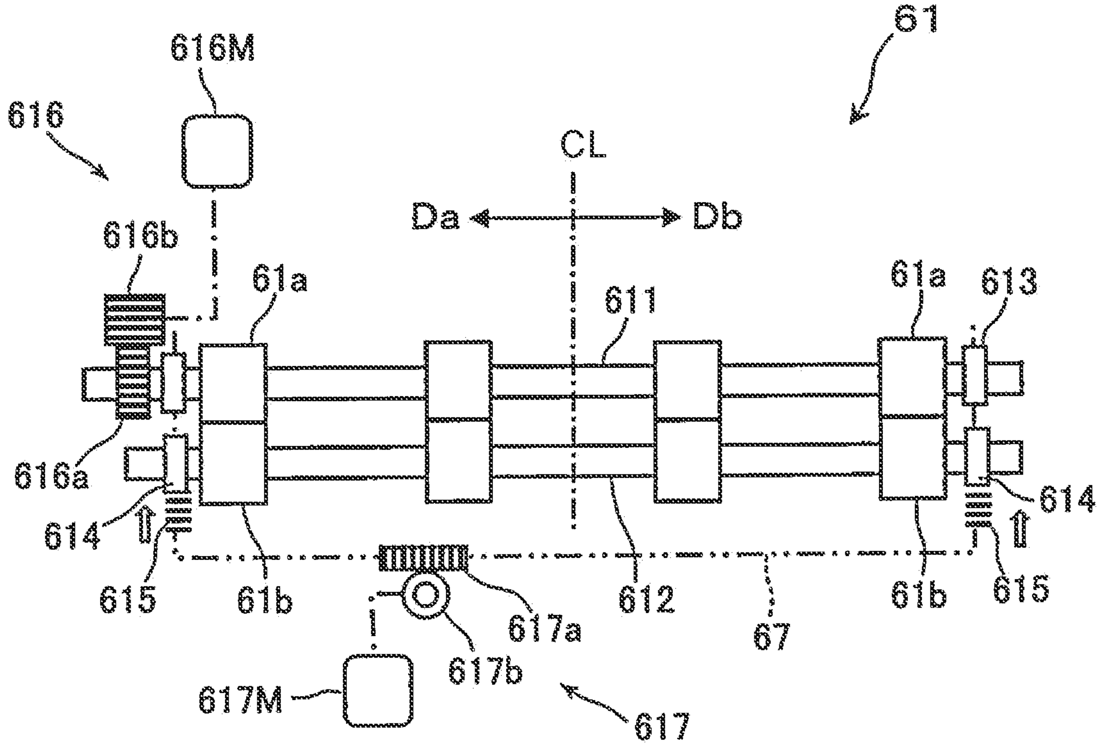
FIG. 3A is a schematic diagram of a first pair of movable transport rollers.

As illustrated in FIG. 3A, the pair of movable transport rollers 61 includes driving rollers 61*a* and driven rollers 61*b* forming pairs, a driving device 616, and a moving device 617.

The driving rollers 61*a* are predetermined pieces of components, and fixed to a rotation shaft 611 at a predetermined distance from each other. The driven rollers 61*b* are predetermined pieces of components, and fixed or rotatably attached to a rotation shaft 612 at a predetermined distance from each other.

In the first exemplary embodiment, driving rollers 61*a* and driven rollers 61*b* are each four divided pieces, but the number of divided pieces is not limited to this. The number of divided pieces holds true to pairs of transport rollers other than the pair of movable transport rollers 61.

The rotation shafts 611 and 612 are rotatably attached to a support frame 67 with bearings 613 and 614.

The driven rollers 61*b* receive the urging force from urging members 615 formed from, for example, coil springs to the driving rollers 61*a* via the bearings 614 displaceably attached to the support frame 67. Thus, the driven rollers 61*b* are in contact with the driving rollers 61*a* at a predetermined pressure.

The driving device 616 transmits the rotation power from a driving motor 616M to a gear 616*a* attached to a first end portion of the rotation shaft 611 via a transmission gear 616*b*. Thus, the driving device 616 rotates the driving rollers 61*a* in an intended direction.

The moving device 617 includes a rack 617*a* attached to the support frame 67, a pinion 617*b* engaged with the rack 617*a*, and a driving motor 617M that transmits the rotation power rotating the pinion 617*b*.

The moving device 617 rotates the pinion 617*b* by an intended amount in an intended direction to move the support frame 67 via the rack 617*a* by an intended distance in any of directions Da and db of the axial direction D. The support frame 67 is attached to, for example, a body frame, not illustrated, of the sheet transport device 5 to be movable in the axial direction D.

The moving device 617 is not limited to the structure according to the first exemplary embodiment.

The pairs of first transport rollers 711 and 712 are multiple pairs of transport rollers that are disposed upstream from the pair of movable transport rollers 61 in the transportation direction C to form a sheet transport path, while being spaced apart from each other, and to transport the sheets 9 while holding the sheets 9. The pair of first transport rollers 711 is a most downstream one of the pairs of first transport rollers disposed immediately upstream from the pair of movable transport rollers 61 in the transportation direction C.

Figure 3B:
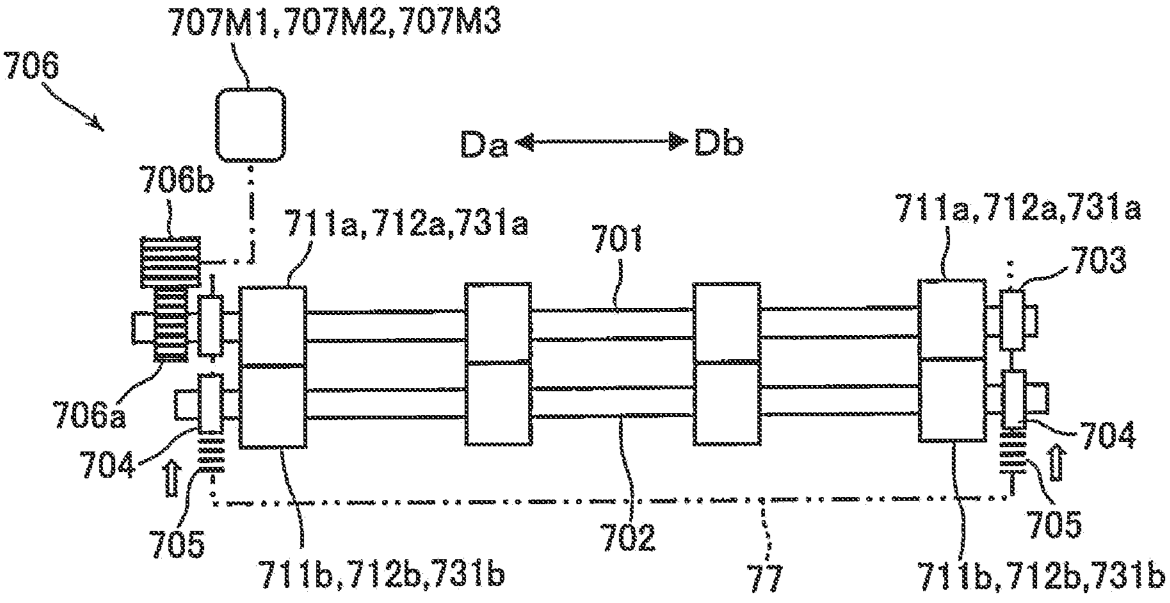
FIG. 3B is a schematic diagram of components including a pair of first transport rollers.

As illustrated in FIG. 3B, the pairs of first transport rollers 711 and 712 include driving rollers 711*a* and 712*a* and driven rollers 711*b* and 712*b*, respectively forming pairs, and a driving device 706.

The pairs of first transport rollers collectively refer to multiple pairs of transport rollers located to hold, when a sheet 9 with the maximum transportable length and handleable by the image forming apparatus 1 is transported and held by the pair of movable transport rollers 61, a portion of the sheet 9 located upstream from the movable transport rollers 61 in the transportation direction C.

The driving rollers 711*a* and 712*a* are multiple divided pieces, which are fixed to a rotation shaft 701 while being spaced an intended distance apart from each other. The driven rollers 711*b* and 712*b* are multiple divided pieces, which are fixed or rotatably attached to a rotation shaft 702 while being spaced an intended distance apart from each other. In the first exemplary embodiment, the driving rollers 711*a* and 712*a* and the driven rollers 711*b* and 712*b* each include four divided pieces, but the number of divided pieces is not limited to this.

The rotation shafts 701 and 702 are rotatably attached to a support frame 77 via bearings 703 and 704.

The driven rollers 711*b* and 712*b* receive the urging force from urging members 705 formed from, for example, coil springs to the driving rollers 711*a* and 712*a* via the bearings 703 and 704 displaceably attached to the support frame 77. Thus, the driven rollers 711*b* and 712*b* are in contact with the driving rollers 711*a* and 712*a* at a predetermined pressure.

When multiple pairs of transport rollers are sequentially arranged at a distance from each other, the driving device 706 may be formed as a common driving device that collectively drives the multiple pairs of transport rollers except when each pair of transport rollers is to be disposed separately. This holds true to driving devices for other multiple pairs of transport rollers described below.

The driving device 706 transmits the rotation power from a driving motor 707M1 or 707M2 to a gear 706*a* attached to a first end portion of the rotation shaft 701 via a transmission gear 706*b*. Thus, the driving device 706 rotates the driving rollers 711*a* in an intended direction.

The pairs of transport guides 811 and 812 are multiple pairs of guide members disposed between the pair of movable transport rollers 61 and the pairs of first transport rollers 711 and 712 and between the pairs of first transport rollers 711 and 712 to form transport spaces 50 for the sheet 9.

As illustrated in FIG. 2, the transport guides 811 or 812 in each pair are disposed to face each other at an intended distance from each other between the pair of movable transport rollers 61 and the pairs of first transport rollers 711 and 712 or between the pairs of first transport rollers 711 and 712. Thus, the pairs of transport guides 811 and 812 form the transport spaces 50 forming spaces with a predetermined height between the pairs of rollers.

The pairs of transport guides 811 and 812 may form an integrated guide member by integrating the transport guides in different pairs disposed on the same side. Instead of a dedicated guide member, the pairs of transport guides 811 and 812 may be partially formed from a portion of another component disposed near the final transport path 51 serving as a guide surface. This holds true to other pairs of transport guides.

The discharging path 52 is a path along which the sheet 9 that has passed the image forming portion 2 is transported toward the discharging portion 11.

As illustrated in FIG. 2, the discharging path 52 includes components such as multiple pairs of transport rollers 721 to 724, and multiple pairs of transport guides 820. The pairs of transport rollers 721 to 724 have substantially the same structure as the pairs of first transport rollers 711 and 712. The pairs of transport guides 820 have substantially the same structure as the pairs of transport guides 811 and 812.

The first transport path 53 is a path along which the sheets 9A fed from the first feeder 3A are transported to the final transport path 51.

Figure 9:
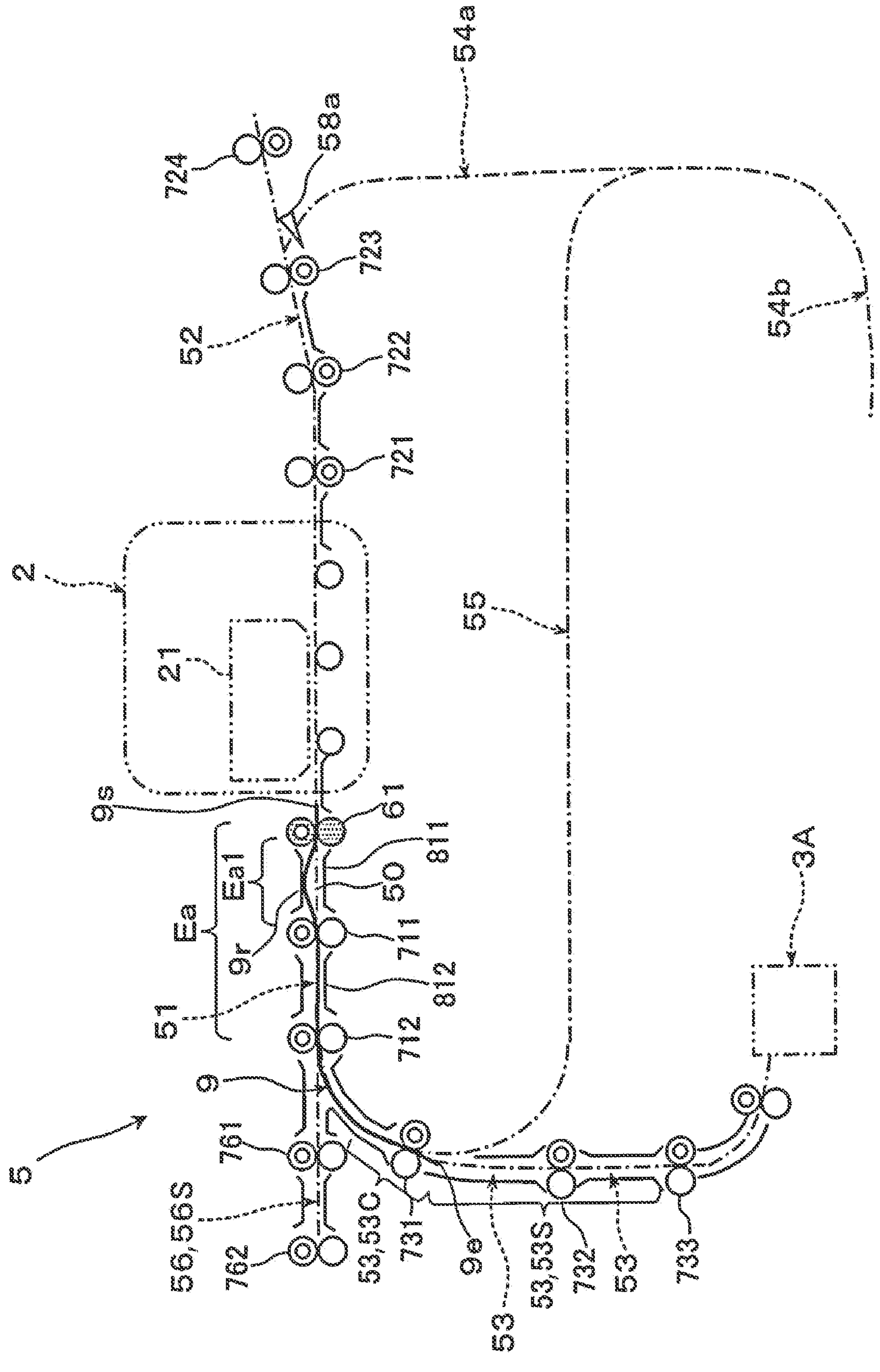
FIG. 9 is a schematic diagram of a related portion illustrating a sheet transportation state corresponding to a transportation operation performed when a pair of movable transport rollers is moved.

As illustrated in FIG. 2, the first transport path 53 includes components such as multiple pairs of transport rollers 731 to 734 and a pair of transport guides 830. As illustrated in FIG. 9, the first transport path 53 according to the first exemplary embodiment includes an intermediate section, which serves as an example of a specific section and is formed from a straight section 53S extending substantially straight, and an upstream section and a downstream section, which serve as other examples of a specific section and formed from bent sections 53C.

The pairs of transport rollers 731 to 734 are arranged at a distance from each other in the transportation direction C to form the first transport path 53, and have substantially the same structure as the pairs of first transport rollers 711 and 712.

The pair of transport guides 830 includes components such as multiple pairs of transport guides 831 and 832 disposed closer to the final transport path 51, and has substantially the same structure as the pairs of transport guides 811 and 812. At a downstream end portion in the transportation direction C or at the pair of transport guides

831, the pair of transport guides 830 is connected to or merged with an upstream end portion of the final transport path 51 in the transportation direction C.

The second transport path 56 allows the sheets 9B fed from the second feeder 3B to be transported to the final transport path 51.

As illustrated in FIG. 2, the second transport path 56 includes components such as multiple pairs of transport rollers 761 to 764 and a pair of transport guides 860. The second transport path 56 according to the first exemplary embodiment includes an upstream section, which serves as an example of a specific section and is formed from a bent section 56C, and an intermediate section and a downstream section, which serve as other examples of a specific section and formed from a straight section 56S extending substantially straight.

The pairs of transport rollers 761 to 764 are arranged at a distance from each other in the transportation direction C to form the second transport path 56, and have substantially the same structure as the pairs of first transport rollers 711 and 712.

The pair of transport guides 860 includes multiple pairs of transport guides, and has substantially the same structure as the pairs of transport guides 811 and 812. At a downstream end portion in the transportation direction C, the pair of transport guides 860 is connected to or merged with an upstream end portion of the final transport path 51 in the transportation direction C.

The third transport path 57 is a path along which the sheets 9C fed from the third feeder 3C are transported toward the final transport path 51.

As illustrated in FIG. 2, the third transport path 57 includes components such as multiple pairs of transport rollers 771 to 773, one pair of transport guides 871, and other pairs of transport guides not illustrated. The third transport path 57 according to the first exemplary embodiment includes sections that are all bent.

The pairs of transport rollers 771 to 773 are arranged at a distance from each other in the transportation direction C to form the third transport path 57, and have substantially the same structure as the pairs of first transport rollers 711 and 712. The pairs of transport guides not illustrated including the pair of transport guides 871 have substantially the same structure as the pairs of transport guides 811 and 812. At a downstream end portion in the transportation direction C, the pair of transport guides 871 is connected to or merged with a portion of the second transport path 56.

The reversal path 54 is a path that allows the sheets 9 that have passed the image forming portion 2 to be inverted while being transported.

The reversal path 54 according to the first exemplary embodiment includes a drawing path 54*a* that draws the sheet 9 that is to be inverted into the reversal path 54, and a reversal discharging path 54*b* along which the sheet 9 that has been drawn into the drawing path 54*a* is transported to be inverted. The reversal discharging path 54*b* temporarily stops and accommodates the sheet 9.

The drawing path 54*a* of the reversal path 54 includes components such as multiple pairs of transport rollers 741 to 743, multiple pairs of transport guides not illustrated, and a destination switching member 58*a*.

The pairs of transport rollers 741 to 743 are arranged at a distance from each other in the transportation direction C to form a drawing path, and have substantially the same structure as the pairs of first transport rollers 711 and 712. The pairs of transport guides not illustrated have substantially the same structure as the pairs of transport guides 811 and 812. Each of the pairs of transport guides forms a transport space that diverges from a portion of the discharging path 52 and extends to a lower portion of the body 10.

The destination switching member 58*a* is disposed at the portion diverging from the discharging path 52 toward the drawing path 54*a*, and partially enters either the discharging path 52 or the reversal path 54 to enable switching of the destination of the sheet 9.

The destination switching member 58*a* moves to either one of a discharging switch position for guiding the sheet 9 to be transported to the discharging path 52 and a reversal switch position for guiding the sheet 9 to be transported to the reversal path 54, and stops in the position.

The reversal discharging path 54*b* of the reversal path 54 includes components such as a pair of transport rollers 744, multiple pairs of transport guides not illustrated, and a destination switching member 58*b*.

The pair of transport rollers 744 has substantially the same structure as the pairs of first transport rollers 711 and 712, and is capable of switching the rotation direction to a forward or rearward direction. The pairs of transport guides not illustrated form a transport space with a length and a shape that allow the sheet 9 in full length to be drawn into the drawing path 54*a*, temporarily accommodate the sheet 9 in the drawing path 54*a*, and then allow the sheet 9 to be fed to the re-transport path 55 while having the trailing end of the sheet 9 in the transportation direction when drawn serving as the leading end. The pairs of transport guides have substantially the same structure as the pairs of transport guides 811 and 812. The pair of transport guides at an upstream end portion in the transportation direction C forms a diverging connection portion that is connected to the re-transport path 55.

The destination switching member 58*b* is disposed at the diverging portion of the reversal discharging path 54*b* to be connected to the re-transport path 55, and partially enters the drawing path 54*a* to be capable of switching the destination of the sheet 9 to the re-transport path 55. The destination switching member 58*b* moves to either a reversal switch position for guiding the sheet 9 to be transported to the reversal discharging path 54*b* or a re-transport switch position for guiding the sheet 9 to the re-transport path 55, and stops in the position.

The re-transport path 55 is a path along which the sheet 9 inverted at the reversal path 54 is transported again toward the final transport path 51.

The re-transport path 55 includes components such as a pair of movable transport rollers 63, multiple pairs of second transport rollers 711, 712, and 731 disposed between the two pairs of movable transport rollers 61 and 63, multiple pairs of third transport rollers 751 to 757 disposed upstream from the pair of movable transport rollers 63 in the transportation direction C, and multiple pairs of transport guides 811, 812, 831, 832, and 851 to 858.

Figure 12:
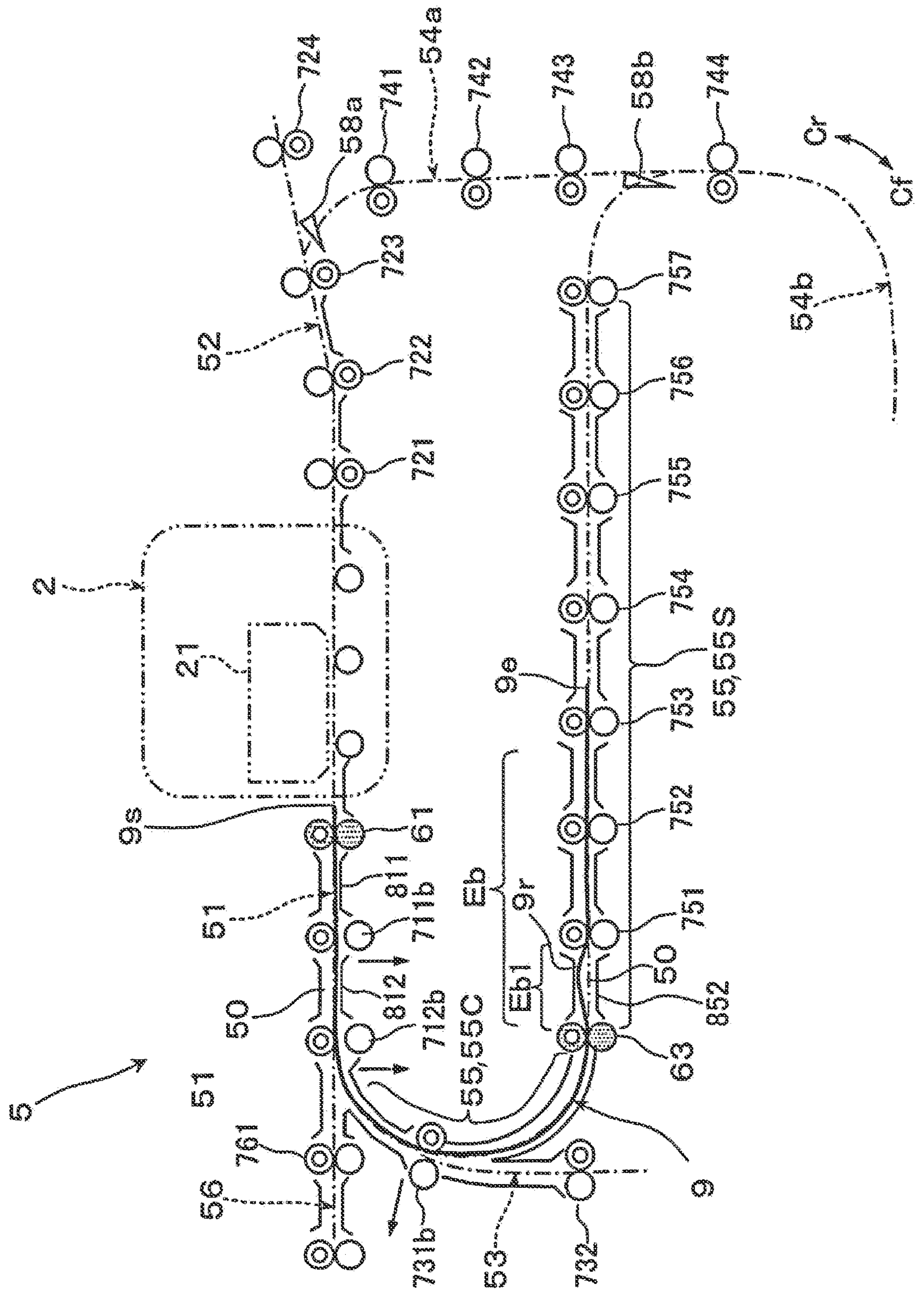
FIG. 12 is a schematic diagram of a related portion of the sheet transportation state corresponding to the transportation operation performed when two pairs of movable transport rollers are moved.

As illustrated in FIG. 12 and other drawings, the re-transport path 55 according to the first exemplary embodiment includes an upstream section, which serves as an example of a specific section and is formed from a bent section 55C, and an intermediate section and a downstream section serving as examples of specific sections and formed from a straight section 55S extending substantially straight. The bent section 55C of the re-transport path 55 is merged with the bent section 53C of the first transport path 53 to overlap the bent section 53C.

The pair of movable transport rollers 63 is a pair of transport rollers capable of transporting the sheet 9 while holding the sheet 9 and capable of moving in the axial direction D crossing the transportation direction C. The pair of movable transport rollers 63 is an upstream pair of movable transport rollers disposed upstream from the pair of movable transport rollers 61 in the transportation direction C.

Figure 4A:
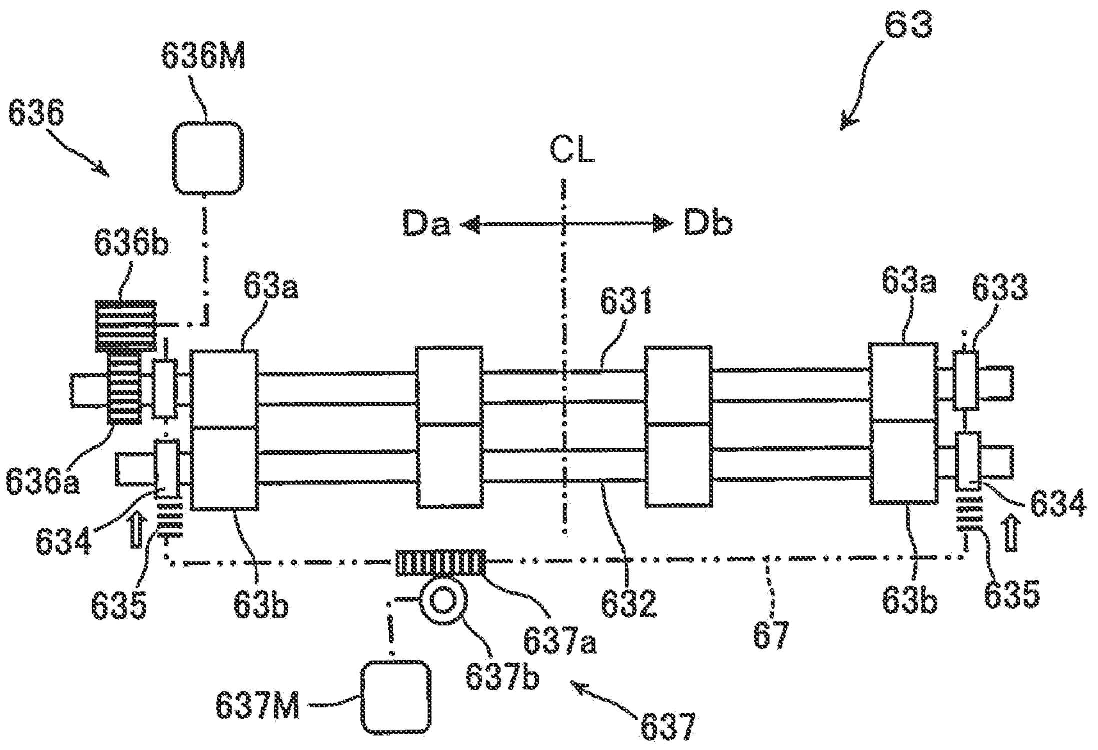
FIG. 4A is a schematic diagram of a second pair of movable transport rollers.

As illustrated in FIG. 4A, the pair of movable transport rollers 63 includes driving rollers 63*a* and driven rollers 63*b* forming pairs, a driving device 636, and a moving device 637.

The driving rollers 63*a* and the driven rollers 63*b* have substantially the same structure as the driving rollers 61*a* and the driven rollers 63*b* in the pair of movable transport rollers 61. In FIG. 4A, the pair of movable transport rollers 63 includes rotation shafts 631 and 632 of the driving rollers 63*a* and the driven rollers 63*b*, urging members 635, and the support frame 67.

The driving device 636 transmits the rotation power from a driving motor 636M to a gear 636*a* attached to a first end portion of the rotation shaft 631 via a transmission gear 636*b* to rotate the driving rollers 63*a* in an intended direction.

The moving device 637 moves the support frame 67, via a rack 637*a* attached to the support frame 67, by only an intended distance in any of the directions Da and db of the axial direction D via a pinion 637*b* that receives rotation power from a driving motor 637M rotating by an intended amount in an intended direction. The moving device 637 is not limited to the structure according to the first exemplary embodiment.

The pairs of second transport rollers 711, 712, and 731 are pairs of transport rollers disposed between the two pairs of movable transport rollers 61 and 63.

The pairs of second transport rollers 711, 712, and 731 have the above structure (refer to FIG. 3B).

The pairs of third transport rollers 751 to 757 are multiple pairs of transport rollers that are arranged at a distance from each other upstream from the upstream pair of movable transport rollers 63 in the transportation direction C to form a sheet transport path to transport the sheet 9 while holding the sheet 9. The pair of third transport rollers 751 is a most downstream one of the pairs of third transport rollers disposed immediately upstream from the pair of movable transport rollers 63 in the transportation direction C.

Figure 4B:
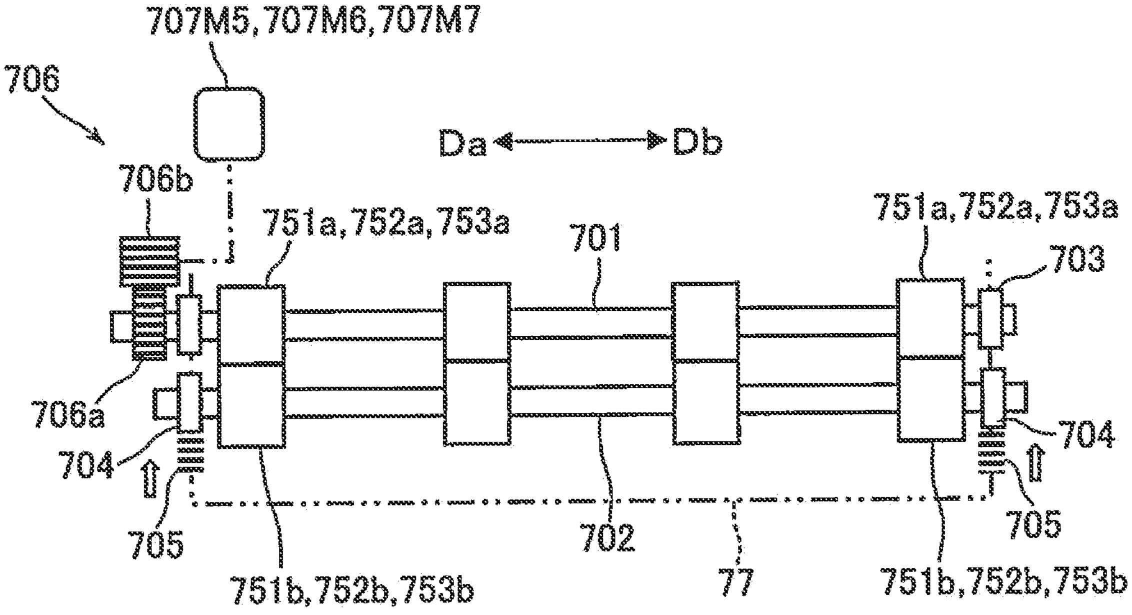
FIG. 4B is a schematic diagram of a pair of third transport rollers.

The pairs of third transport rollers 751 to 753 typically illustrated in FIG. 4B include driving rollers 751*a*, 752*a*, and 753*a* and driven rollers 751*b*, 752*b*, and 753*b*, forming pairs, and the driving device 706. The pairs of third transport rollers 754 to 757 also have the similar structure.

The pairs of third transport rollers refer to multiple pairs of transport rollers located to hold, when a sheet 9 with a maximum transportable length and handleable by the image forming apparatus 1 is transported and held by the two pairs of movable transport rollers 61 and 63, a portion of the sheet 9 located upstream from the upstream pair of movable transport rollers 63 in the transportation direction C.

The driving rollers 751*a*, 752*a*, and 753*a* and the driven rollers 751*b*, 752*b*, and 753*b* have the same structures as driving rollers 711*a*, 712*a*, and 731*a* and driven rollers 711*b*, 712*b*, and 731*b* of the pairs of first transport rollers 711 and 712, and the pairs of second transport rollers 711, 712, and 731 (refer to FIG. 3B).

The driving device 706 has the same structure as the driving device 706 for the pairs of first transport rollers 711 and 712 and the pairs of the second transport rollers 711, 712, and 731 (refer to FIG. 3B).

Figure 5A:
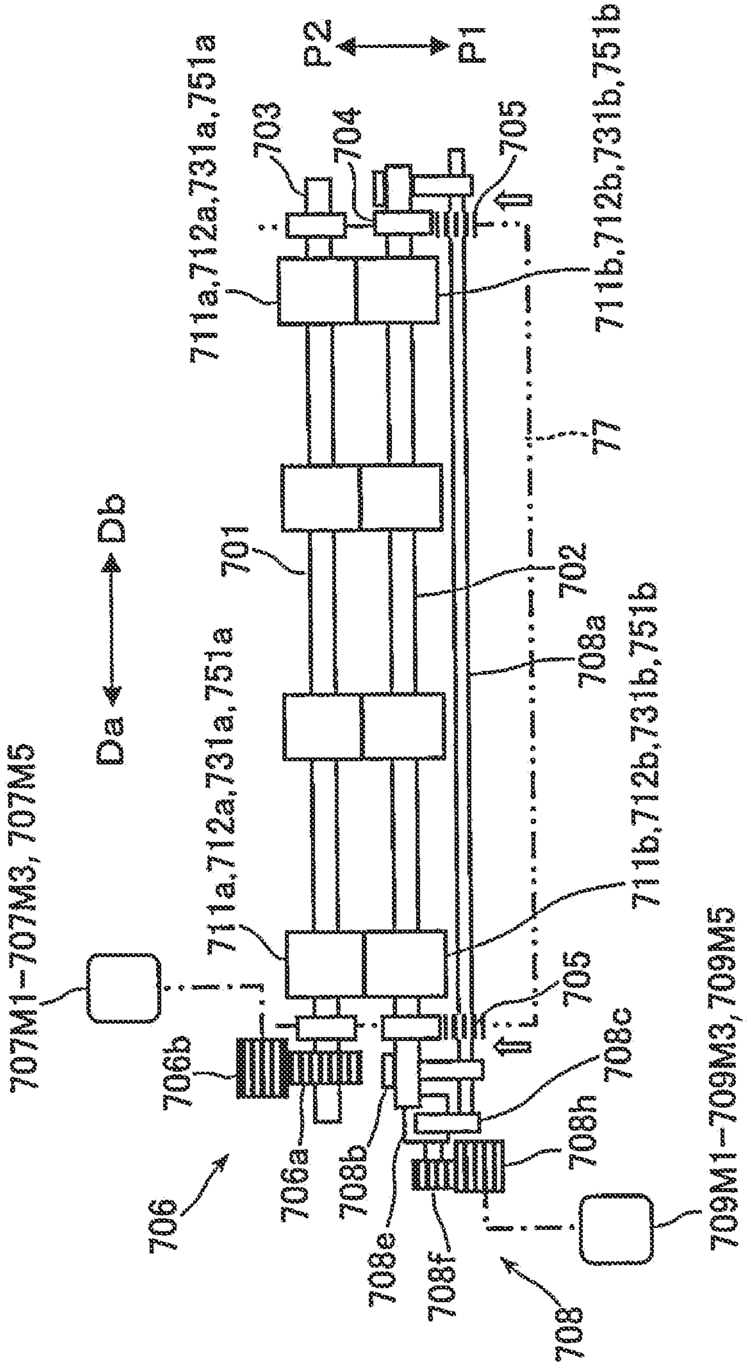
FIG. 5A is a schematic diagram of a pair of separable transport rollers.
Figure 5B:
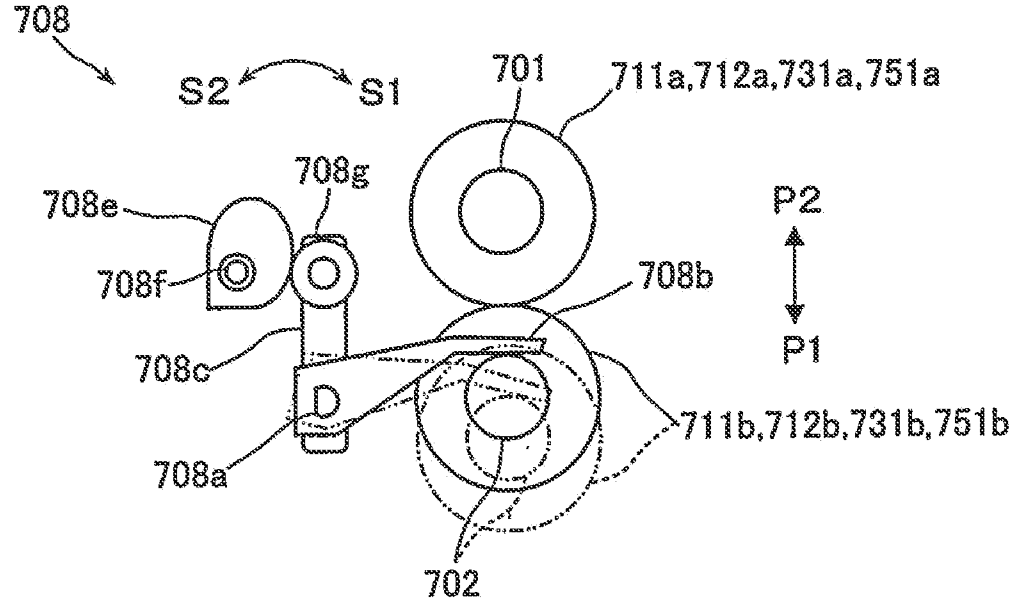
FIG. 5B is a side schematic diagram of the pair of transport rollers in FIG. 5A.

As illustrated in FIGS. 5A and 5B, in the sheet transport device 5, the pairs of transport rollers 711, 712, and 731 corresponding to both the pairs of first transport rollers and the pairs of second transport rollers and the most downstream pair of third transport rollers 751 are pairs of separable transport rollers that are separable.

These pairs of transport rollers 711, 712, 731, and 751 each include a separating device 708.

In the separating device 708, a pressing bar **708*b* fixedly attached to a rotation shaft 708*a* is lowered in a direction of arrow P1 by an eccentric cam 708*e*, to press the rotation shafts 702 of the driven roller 711*b*, 712*b*, 731*b*, or 751*b* in a direction away from the rotation shaft 701 against the urging force of the urging members 705. Thus, the driven roller 711*b*, 712*b*, 731*b*, or 751*b* is separated from the corresponding driving roller 711*a*, 712*a*, 731*a*, or 751*a***.

A swing bar **708*c* is fixedly attached to the rotation shaft 708*a*. A cam receiver 708*g* is disposed at a free end portion of the swing bar 708*c*. The eccentric cam 708*e* is fixed to a rotation shaft 708*f*. The rotation shaft 708*f* receives the rotation power of one of driving motors 709M1 to 709M3 and 709M5 transmitted via a gear 708*h*, and rotates by an intended angle in an intended direction. When rotated by the rotation shaft 708*f*, a large-diameter portion and a small-diameter portion of the eccentric cam 708*e* come into contact with the cam receiver 708*g***.

When the swing bar **708*c* is swung by the eccentric cam 708*e* against the urging force of an urging member not illustrated in a direction of arrow S1, the separating device 708 is moved to lower the pressing bar 708*b* in the direction of arrow P1. Thus, the rotation shaft 702 is moved away from the rotation shaft 701**.

When the swing bar **708*c* is swung by the eccentric cam 708*e* in the direction of arrow S2, the separating device 708 is moved to raise the pressing bar 708*b* in the direction of arrow P2. Thus, the rotation shaft 702 is moved toward the rotation shaft 701** to be returned to a contact position in a normal state.

As illustrated in FIG. 2, the sheet transport device 5 includes a first passage sensor **59*a*, a second passage sensor 59*b*, a third passage sensor 59*c*, and a misregistration detector 65**.

The first passage sensor **59*a* is a sensor that detects that a leading end 9*s* and a trailing end 9*e* of the sheet 9 transported along the final transport path 51 have passed through the pair of movable transport rollers 61. The first passage sensor 59*a* is located at a portion of the final transport path 51 downstream from the pair of movable transport rollers 61 and in front of the image forming portion 2** in the transportation direction C.

The second passage sensor **59*b* is a sensor that detects that the trailing end 9*e* of the sheet 9 transported along the re-transport path 55 has finished passing through the pair of movable transport rollers 63. The second passage sensor 59*b* is located at a portion of the re-transport path 55 downstream from the pair of movable transport rollers 63** in the transportation direction C.

The third passage sensor **59*c* is a sensor that detects that the trailing end 9*e* of the sheet 9 transported along the reversal path 54 has finished passing the destination switching member 58*b*. The third passage sensor 59*c* is located at a portion of the reversal path 54 downstream from the destination switching member 58*b*** in the transportation direction C.

Optical sensors are used as examples of the first passage sensor **59*a*, the second passage sensor 59*b*, and the third passage sensor 59*c***.

The misregistration detector 65 is a sensor that detects deviation of the sheet 9 transported along the final transport path 51 from a transportation reference line CL in the axial direction (width direction) D. The misregistration detector 65 is located at a portion of the final transport path 51 between the pair of movable transport rollers 61 and a most downstream pair of first transport rollers 711, among the pairs of first transport rollers, disposed immediately upstream from the pair of movable transport rollers 61 in the transportation direction C.

A device formed from, for example, an image reading sensor or an image processing device is used as an example of the misregistration detector 65.

Figure 6:
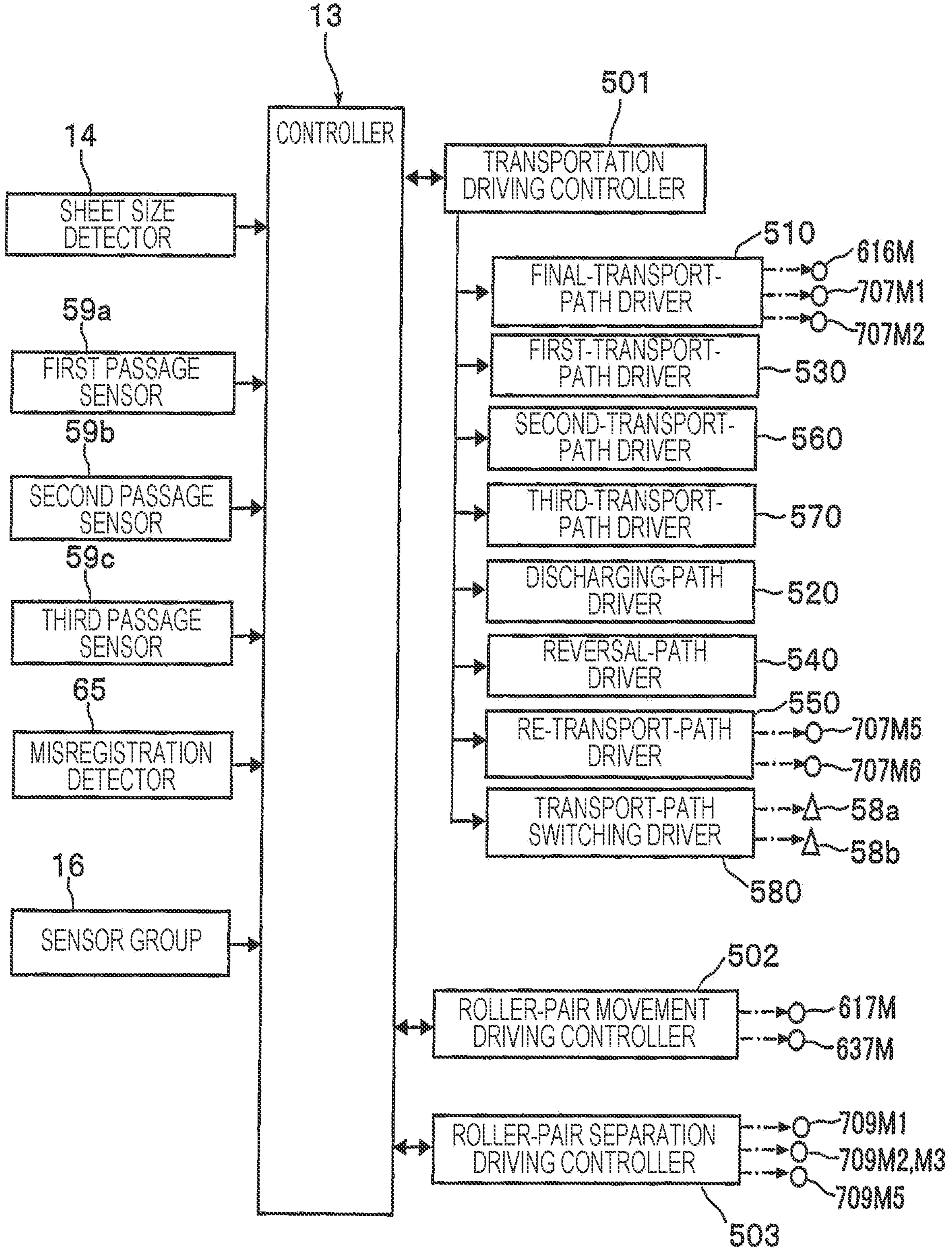
FIG. 6 is a functional block diagram of a control system of a sheet transport device.

As illustrated in FIG. 6, the sheet transport device 5 also includes a controller 13.

The controller 13 is formed from a device such as a microcomputer including, for example, a processor, a storage, and an input-output device. The controller 13 may be an independent control device, or a portion, as illustrated in FIG. 1, having a controlling function, of the control device 12 that generally controls the entire operations of the image forming apparatus 1.

As illustrated in FIG. 6, components such as a transportation driving controller 501, a roller-pair movement driving controller 502, and a roller-pair separation driving controller 503 are connected to the controller 13 for enabling communications of information.

The transportation driving controller 501 controls the transportation operation at each transport path.

Components such as a final-transport-path driver 510, a first-transport-path driver 530, a second-transport-path driver 560, a third-transport-path driver 570, a discharging path driver 520, a reversal path driver 540, a re-transport path driver 550, and a transport-path switching driver 580 are connected to the transportation driving controller 501 to be controlled by the transportation driving controller 501.

The final-transport-path driver 510 is a driver to perform the transportation operation at the final transport path 51. The final-transport-path driver 510 includes components such as the driving motor 616M of the pair of movable transport rollers 61 and the driving motors 707M1 and 707M2 of the pairs of first transport rollers 711 and 712.

The first-transport-path driver 530 is a driver to perform the transportation operation at the first transport path 53. The second-transport-path driver 560 is a driver to perform the transportation operation at the second transport path 56. The third-transport-path driver 570 is a driver to perform the transportation operation at the third transport path 57.

The discharging path driver 520 is a driver to perform the transportation operation at the discharging path 52. The reversal path driver 540 is a driver to perform the transportation operation at the reversal path 54. The re-transport path driver 550 is a driver to perform the transportation operation at the re-transport path 55.

The transport-path switching driver 580 is a driver to perform a switching operation on the destination switching members **58*a* and 58*b***.

The roller-pair movement driving controller 502 is a driver to perform the moving operation on the two pairs of movable transport rollers 61 and 63. The roller-pair movement driving controller 502 includes components such as the driving motors 617M and 637M.

The roller-pair separation driving controller 503 is a driver to perform the separation operation on, for example, the pairs of separable transport rollers 711, 712, 731, and 751. The roller-pair separation driving controller 503 includes components such as driving motors 709M1, 709M2, 709M3, and 709M5.

As illustrated in FIG. 6, components such as a sheet size detector 14, the first passage sensor **59*a*, the second passage sensor 59***b*, the third passage sensor 59*c*, the misregistration detector 65, and a sensor group 16 are connected to the controller 13 to enable communications of information.

The sheet size detector 14 is formed as an obtaining unit that obtains size information of the sheet 9 included in command information for the image forming operation input to the image forming apparatus 1, or as a measuring device that measures the size of the sheets 9A, 9B, and 9C accommodated in the feeders 3A, 3B, and 3C.

The sensor group 16 includes a group of sensors that detect various information used for, for example, the transportation operation of the sheets 9.

Figure 7A:
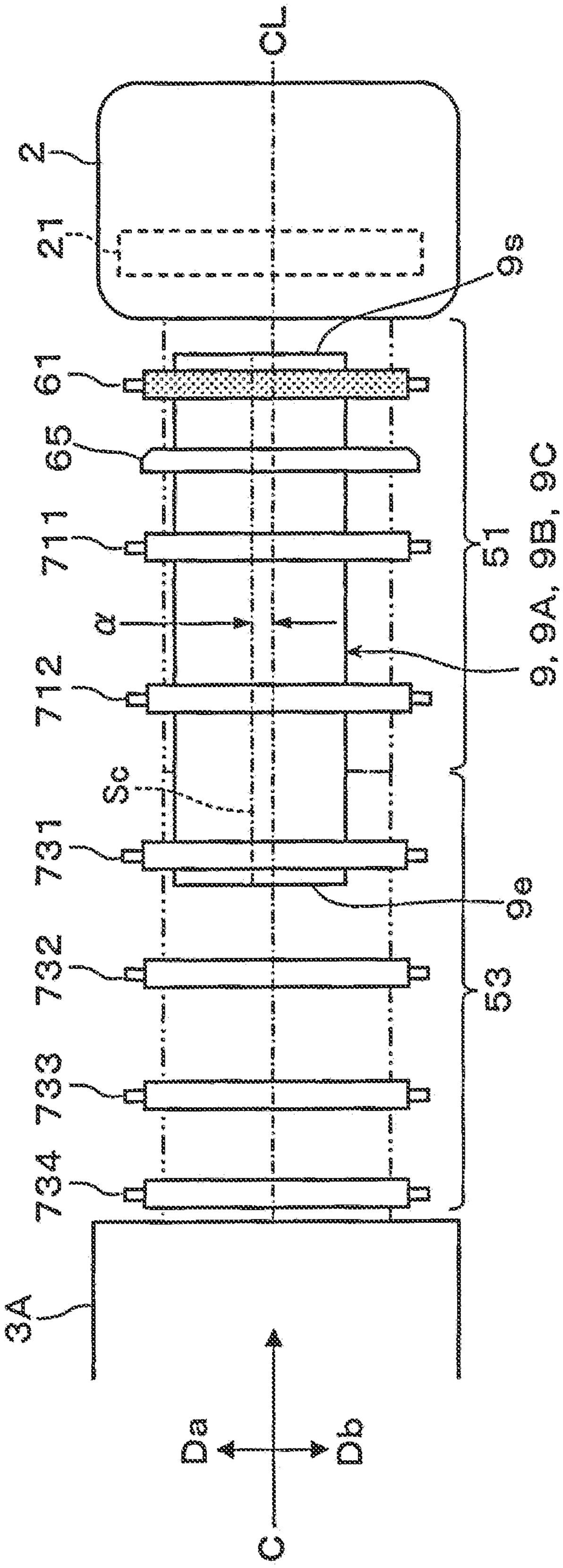
FIG. 7A is a diagram illustrating the transportation state of a sheet transported while being deviated in an axial direction.

Operation of Correcting Deviation in Axial Direction During Sheet Transportation As illustrated in FIG. 7A, the sheet transport device 5 may transport, along the final transport path 51, the sheet 9 (9A, 9B, or 9C) with a deviation in the axial direction D with respect the transportation reference line CL.

For example, the sheet transport device 5 illustrated in FIG. 7A employs a center registration method for performing a transportation operation while using the center position of the final transport path 51 in the axial direction D as the transportation reference line CL, and aligning the center position of the sheet 9 in the width direction with the transportation reference line CL. FIG. 7A illustrates an example case where the sheet 9 fed from the first feeder 3A is transported to the final transport path 51 through the first transport path 53. A dot-and-dash line Sc in FIG. 7A and other drawings indicates the center line connecting the center of the sheet 9 in the width direction while being transported.

Figure 7B:
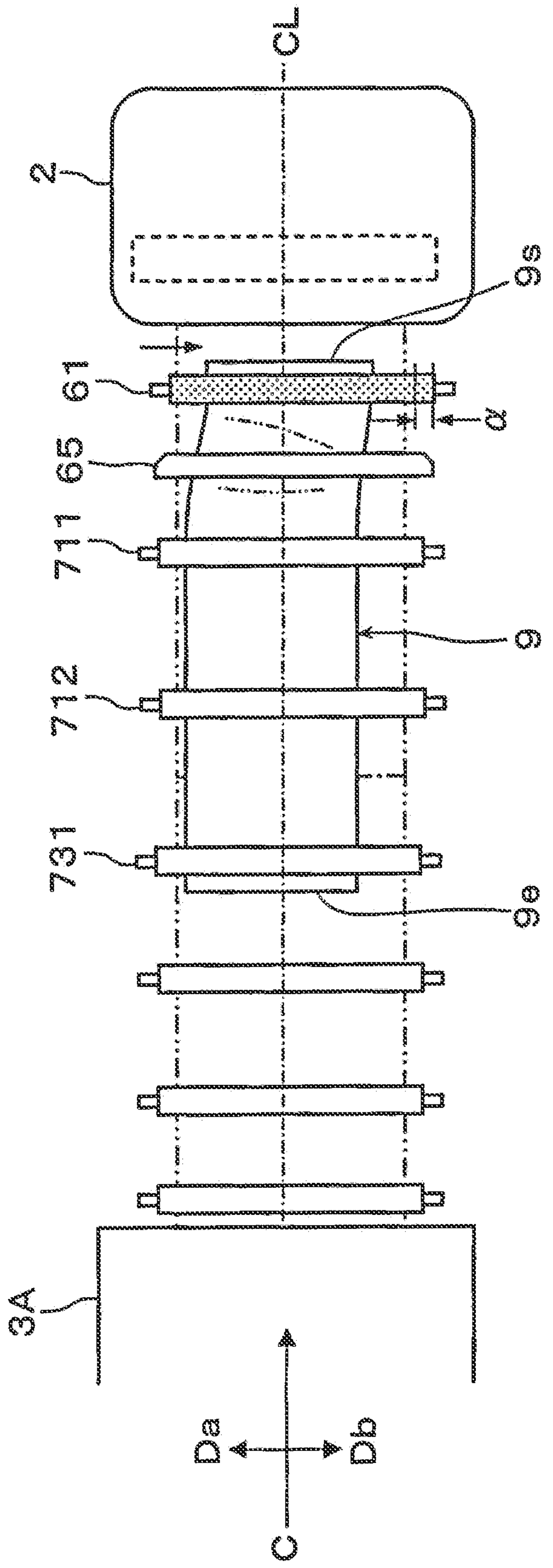
FIG. 7B is a diagram illustrating the state of a sheet when a pair of movable transport rollers is moved.
Figure 8:
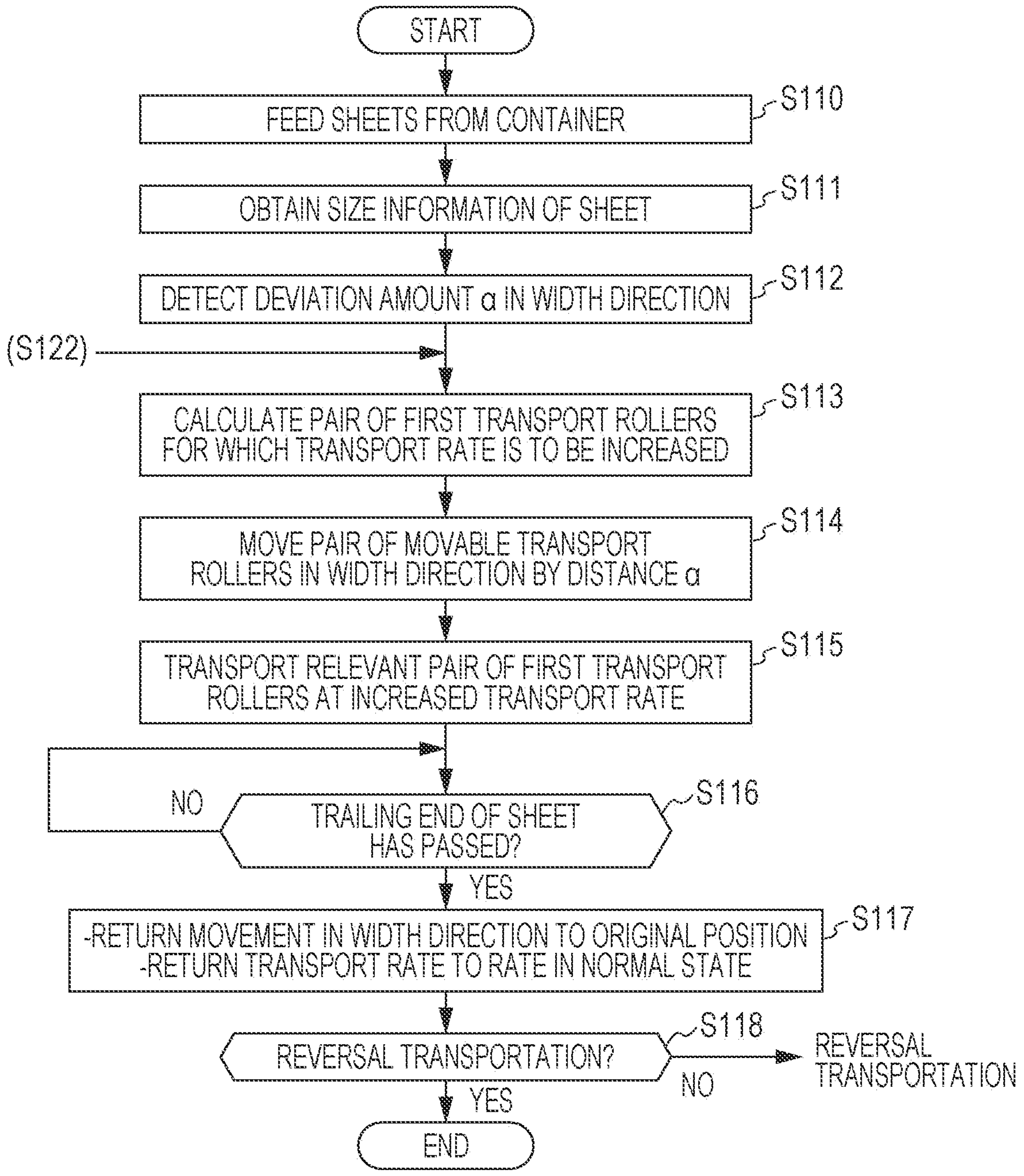
FIG. 8 is a flowchart of a transportation operation not including reversal transportation.

In contrast, in the sheet transport device 5, as illustrated in FIG. 7B and part of FIG. 8, when the misregistration detector 65 detects a deviation amount α in the axial direction D, the pair of movable transport rollers 61 moves in the intended direction Da or db of the axial direction D by an intended distance α while holding the sheet 9 to correct the deviation amount α. FIG. 7B illustrates an example case where the pair of movable transport rollers 61 has moved in the intended direction db of the axial direction D.

Figure 13A:
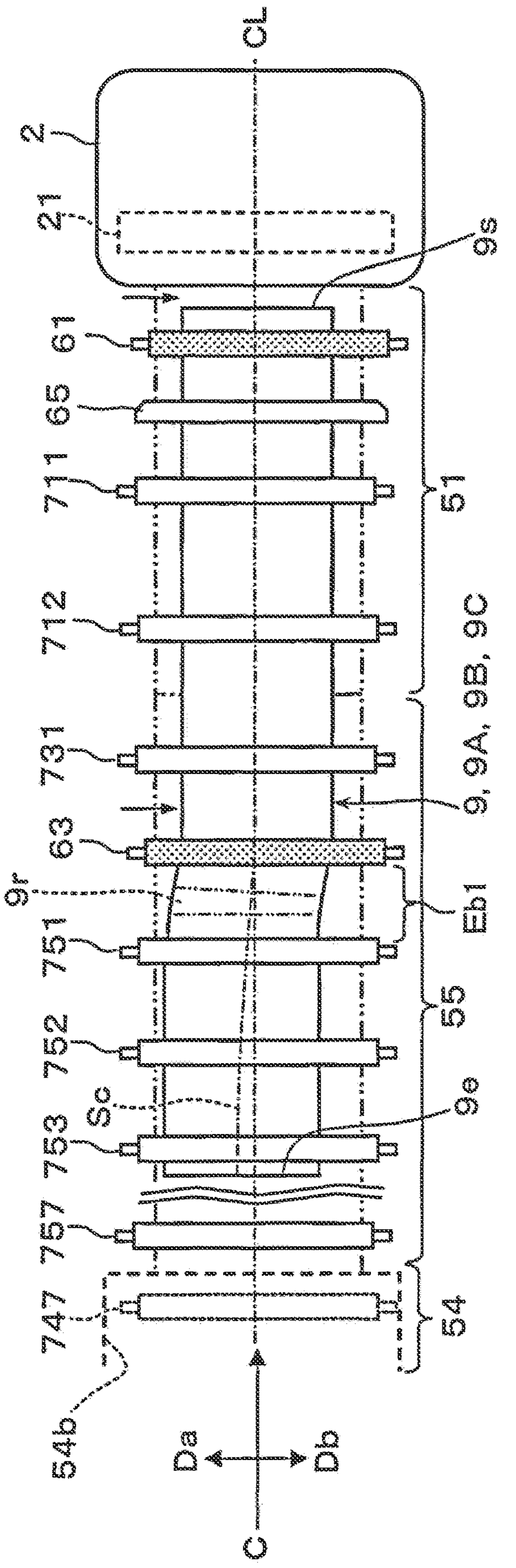
FIG. 13A is a diagram illustrating the state of a sheet when the transportation operation in FIG. 12 is performed.
Figure 20A:
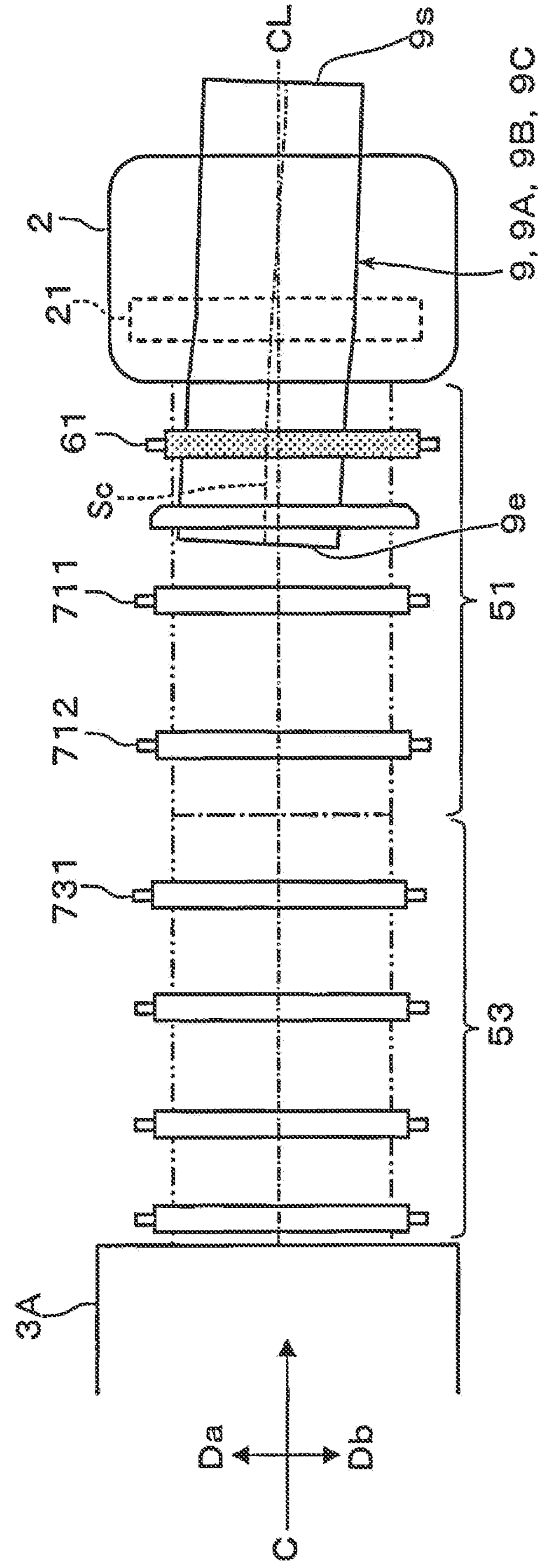
FIG. 20A is a diagram illustrating an example state of a transportation failure when the transportation operation is kept after simply moving a pair of movable transport rollers.
Figure 20B:
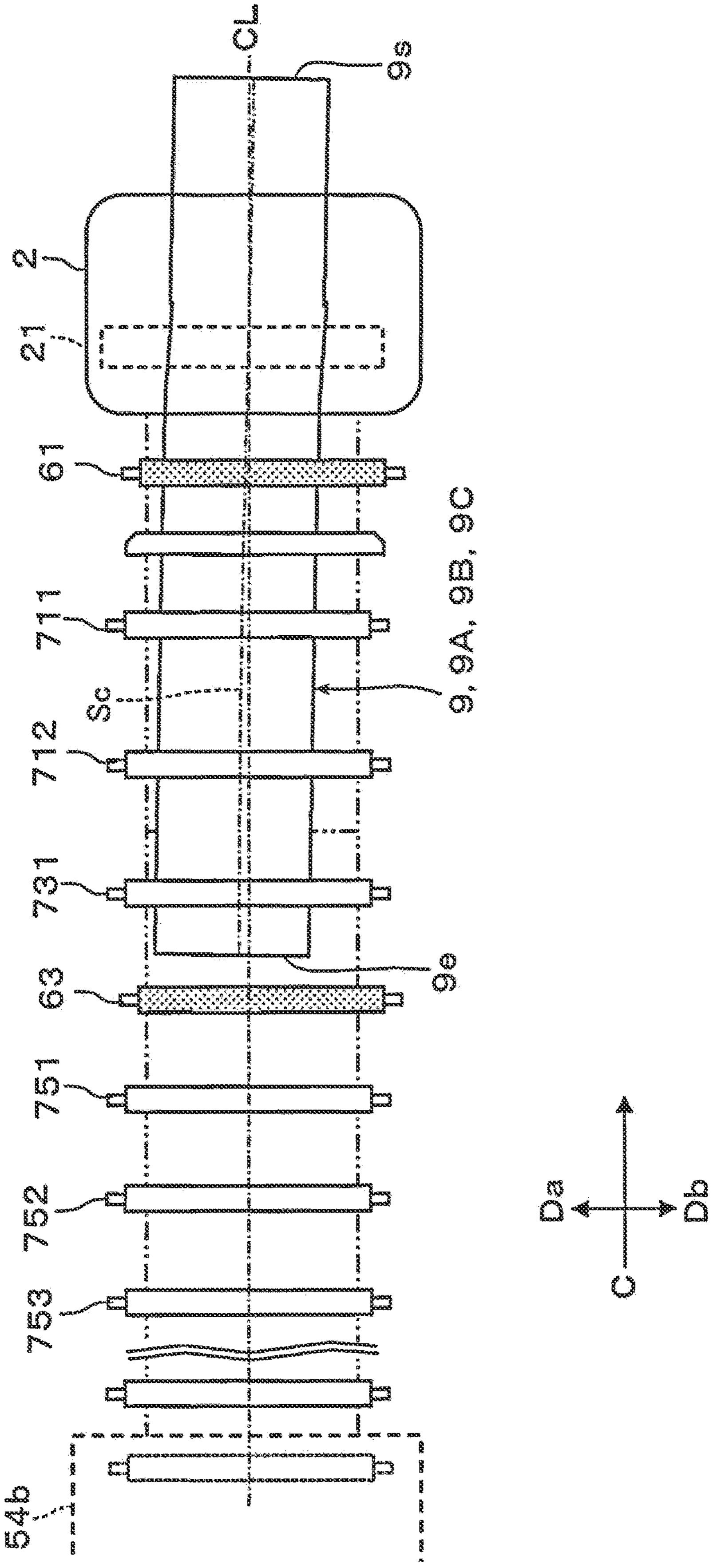
FIG. 20B is a diagram illustrating an example state of a transportation failure caused when the transportation operation is kept after simply moving two pairs of movable transport rollers.

In the sheet transport device 5, when the deviation amount α, in the axial direction D, of the sheet 9 re-transported from the re-transport path 55 to the final transport path 51 reaches or exceeds a predetermined value M, as illustrated in FIG. 13A or FIG. 20B, the two pairs of movable transport rollers 61 and 63 move by the intended distance α in the intended direction Da or db of the axial direction D while holding the sheet 9 to correct the deviation amount α. FIG. 20B also illustrates a case where the two pairs of movable transport rollers 61 and 63 have moved in the intended direction db of the axial direction D.

When the sheet transport device 5 that performs this movement operation keeps performing the transportation operation while the pair of movable transport rollers 61 is simply moved in the axial direction D by the intended distance α, the sheet 9 may cause a transportation failure as illustrated in FIG. 20A.

More specifically, in this case, a portion (a trailing-end portion during transportation) of the sheet 9 that is passing through some of the multiple pairs of first transport rollers 711, 712, and 731 disposed upstream from the pair of movable transport rollers 61 in the transportation direction C may be skewed or distorted when the pair of movable transport rollers 61 is moved.

Also when the sheet transport device 5 keeps performing the transportation operation while the two pairs of movable transport rollers 61 and 63 are simply moved in the axial direction D by the intended distance α, the sheet 9 may cause a transportation failure as illustrated in FIG. 20B.

In this case, a portion of the sheet 9 that is passing through some of the multiple pairs of third transport rollers 751, 752, and 753 disposed upstream from the upstream pair of movable transport rollers 63 in the transportation direction C may be skewed or distorted when the pairs of movable transport rollers 61 and 63 are moved.

Also in these cases, the trailing-end portion of the sheet 9 passes through the pair of movable transport rollers 61 while being skewed or distorted, and then is introduced into and passes through the image transfer portion 21 in the image forming portion 2. Thus, the image forming apparatus 1 fails to correctly form an image on the sheet 9 at an intended position.

Structure Relating to Transportation Operation for Moving Pair of Movable Transport Rollers As illustrated in FIG. 8 to FIG. 10B, in the sheet transport device 5 according to the first exemplary embodiment, when the pair of movable transport rollers 61 is moved in the axial direction D, at least one of the pairs of first transport rollers 711 and 712, and the pairs of transport rollers 731 to 734 disposed upstream from the pair of movable transport rollers 61 in the transportation direction C produces a difference in transport rate at a portion of a section Ea upstream from the pair of movable transport rollers 61 to transport the sheet 9 in a bent state in the transport space 50.

Figure 10A:
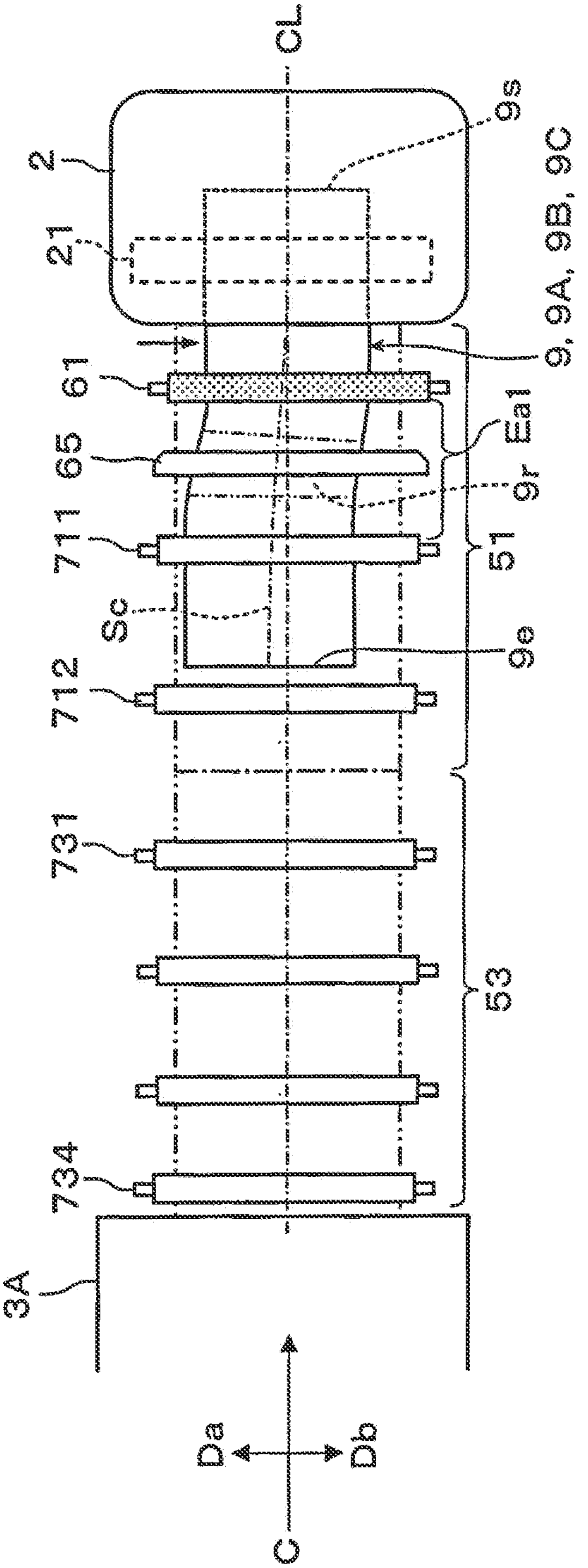
FIG. 10A is a diagram illustrating the sheet transportation state when the transportation operation in FIG. 9 is performed.
Figure 10B:
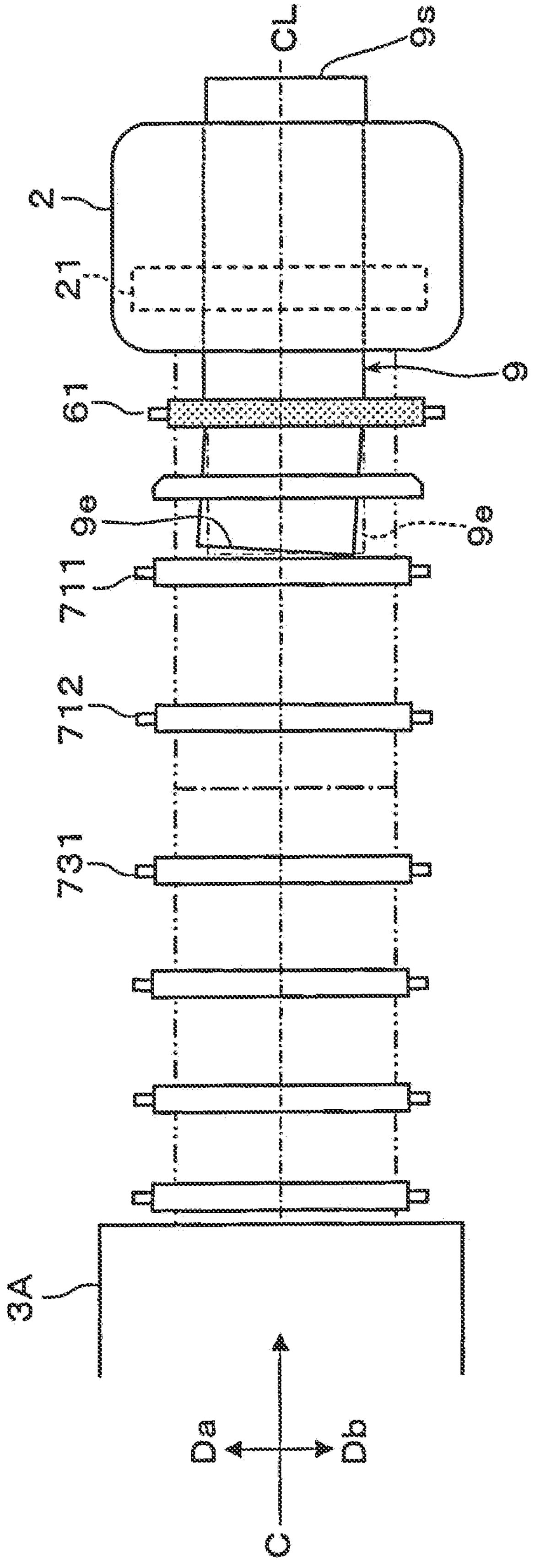
FIG. 10B is a diagram illustrating the state where a trailing end of the sheet in FIG. 10A passes through a most downstream one of the pairs of first transport rollers.

FIG. 9 and FIGS. 10A and 10B illustrate a portion 9*r* of the sheet that is transported in a bent (bent in a convex shape) state in the transport space 50.

As illustrated in FIG. 11 to FIG. 13B, in the sheet transport device 5, when the two pairs of movable transport rollers 61 and 63 are moved in the axial direction D, one or more of the pairs of third transport rollers 751 to 757 disposed upstream from the upstream pair of movable transport rollers 63 in the transportation direction C produces a difference in transport rate at a portion of a section Eb disposed upstream from the upstream pair of movable transport rollers 63 to transport the sheet 9 in a bent state in the transport space 50. FIG. 12 and FIG. 13A illustrate the portion 9*r* of the sheet transported in a bent state in the transport space 50.

In the first exemplary embodiment, as illustrated in FIG. 9 and other drawings, the portion of the section Ea corresponds to a first section Ea1 disposed between the pair of movable transport rollers 61 and the most downstream pair of first transport rollers 711.

In the first exemplary embodiment, as illustrated in FIG. 12 and other drawings, the portion of the section Eb corresponds to a first section Eb1 disposed between the upstream pair of movable transport rollers 63 and the most downstream pair of third transport rollers 751.

The difference in transport rate is preliminarily set with the transportation driving controller 501 performing a control to change the transport rate of the most downstream pair of first transport rollers 711 to a transport rate V2 (>V1) higher than a transport rate V1 in the normal state while keeping the transport rate of the pair of movable transport rollers 61 at the transport rate V1 in the normal state.

The difference in transport rate is preliminarily set with the transportation driving controller 501 performing a control to change the transport rate of the most downstream pair of third transport rollers 751 to a transport rate V4 (>V3) higher than a transport rate V3 in the normal state while keeping the transport rate of the pair of movable transport rollers 63 at the transport rate V3 in the normal state.

The high transport rate V2 of the most downstream pair of first transport rollers 711 is set to allow the bent portion of the sheet to be kept away from the transport guides 811 disposed in the first section Ea1 or to allow the bent portion to slightly touch the transport guides 811. Similarly, the high transport rate V4 of the most downstream pair of third transport rollers 751 is set to allow the bent portion of the sheet to be kept away from a transport guides 852 located in the first section Eb1 or to allow the bent portion to slightly touch the transport guides 852.

Information of such settings of the transport rate is preliminarily stored in the storage of the controller 13 as a control program or data.

The transport rate V1 of the pair of movable transport rollers 61 in the normal state and the transport rate V3 of the pair of movable transport rollers 63 in the normal state are set the same. The high transport rate V2 of the most downstream pair of first transport rollers 711 and the high transport rate V4 of the most downstream pair of third transport rollers 751 are set the same, but may be different.

Transportation Operation of Sheet Transport Device

Subsequently, the transportation operation of the sheet transport device 5 will be roughly described.

When the image forming apparatus 1 performs image formation, the sheet transport device 5 feeds sheets 9 of the type and the size appropriate for the image formation from the sheet container of each transportation start portion 3 accommodating the sheets 9 (Step S110 in FIG. 8). Although the first exemplary embodiment describes, with reference to the drawings, a case where a sheet 9 (9A) is fed from the first feeder 3A for convenience, the sheet 9 to be fed is not limited to the sheet 9A fed from the first feeder 3A.

The sheet 9 (9A) fed from the first feeder 3A is transported to the final transport path 51 through the first transport path 53. The sheet 9 illustrated in FIGS. 7A and 7B and the following drawings is any of the sheets 9A, 9B, and 9C.

Subsequently, the controller 13 obtains the size information of the sheet 9 (Step S111), and, when the sheet 9 passes the final transport path 51, the misregistration detector 65 detects the deviation amount α of the sheet 9 in the axial direction D (Step S112).

The deviation amount α is detected after the leading end 9*s* of the sheet 9 has passed a measurement area of the misregistration detector 65. The information detected by the misregistration detector 65 is transmitted to the controller 13.

The leading end 9*s* of the sheet 9 transported to the final transport path 51 abuts against a portion between the pair of movable transport rollers 61 and is corrected to be parallel to the axial direction D. Then, the sheet 9 is slightly transported to be held between the pair of movable transport rollers 61 and temporarily stopped.

Subsequently, the controller 13 calculates the pair of first transport rollers for which the transport rate is to be increased (Step S113).

In the first exemplary embodiment, as described above, the sheet 9 is to be transported while being bent in the first section Ea1, and thus the controller 13 calculates the most downstream pair of first transport rollers 711 as a pair of first transport rollers for which the transport rate is to be increased. The calculation in Step S113 may be omitted in a structure where the pair of first transport rollers for which the transport rate is to be increased is preliminarily determined based on the length of the sheet 9. This holds true to the calculations below.

When the deviation amount α is detected, the pair of movable transport rollers 61 is moved in the axial direction D by the intended distance α (Step S114). The pair of movable transport rollers 61 is moved by the controller 13 controlling driving of the driving motor 617M via the roller-pair movement driving controller 502.

Before the pair of movable transport rollers 61 start the moving operation, the transport rate of the most downstream pair of first transport rollers 711 that is to be increased is increased (Step S115), and the transportation operation at the sheet transport paths such as the first transport path 53 and the final transport path 51 is restarted. The transport rate is changed by the controller 13 controlling driving of the driving motor 707M1 in the final-transport-path driver 510 via the transportation driving controller 501.

Thus, as illustrated in FIG. 9, the sheet 9 starts being transported while being bent in the first section Ea1.

At this time, the sheet 9 is transported while being bent in the first section Ea1, and is left easily movable to follow the movement of the pair of movable transport rollers 61.

As illustrated in FIG. 10A, at this time, the leading-end portion of the transported sheet 9 is fed by the pair of movable transport rollers 61, while having the deviation in the axial direction D corrected, to the image transfer portion 21 in the image forming portion 2.

As illustrated in FIG. 10B, when the trailing-end portion of the transported sheet 9 is released from the most downstream pair of first transport rollers 711 and passes therethrough, the trailing end 9*e* of the sheet 9 moves to the pair of movable transport rollers 61 while changing, in the first section Ea1, from the state slightly inclined with respect to the axial direction D as indicated with a solid line in FIG. 10B to the state having no deviation in the axial direction D as indicated with a two-dot chain line in FIG. 10B.

Thus, the sheet 9 is transported while having the trailing-end portion in transportation fed to the image forming portion 2 after the center line Sc of the sheet 9 is substantially aligned with the transportation reference line CL.

Subsequently, after the transportation operation at, for example, the first transport path 53 and the final transport path 51 is restarted, the controller 13 determines whether the trailing end 9*e* of the sheet 9A has passed through the pair of movable transport rollers 61 (Step S116).

At this time, the first passage sensor 59*a* detecting the trailing end 9*e* determines that the trailing end 9*e* of the sheet 9 has passed through the pair of movable transport rollers 61.

When the controller 13 determines in Step S116 that the trailing end 9*e* of the sheet 9 has passed through the pair of movable transport rollers 61, the controller 13 returns the pair of movable transport rollers 61 to the original position (the reference position in the normal state) before transportation, and returns the transport rate of the most downstream pair of first transport rollers 711 to the rate (V1) in the normal state (Step S117).

Thus, the sheet transport device 5 is prepared for the next transportation operation.

Subsequently, the controller 13 determines whether the sheet 9 is to undergo reversal transportation (Step S118).

When the controller 13 determines that the sheet 9 is not to undergo reversal transportation in Step S118, the transportation operation on the sheet 9 is finished.

In this case, the sheet 9 having an image formed on one side is transported through the discharging path 52, and finally accommodated in the discharging portion 11.

Transportation Operation Including Reversal Transportation

When the controller 13 determines that the sheet 9 is to undergo reversal transportation in Step S118, the reversal transportation is subsequently performed.

In the reversal transportation, first, the sheet 9 having an image formed on one surface after passing through the image forming portion 2 is guided by the destination switching member 58*a* from a portion of the discharging path 52 to the reversal path 54.

At this time, the sheet 9 is transported through the drawing path 54*a* of the reversal path 54 and fed to the reversal discharging path 54*b* in a forward direction indicated with arrow Cf (refer to FIG. 2 and FIG. 12). At this time, the sheet 9 is temporarily stopped in the reversal discharging path 54*b* when the trailing end 9*e* of the sheet 9 is detected by the third passage sensor 59*c*.

Subsequently, the sheet 9 transported to the reversal path 54 is transported in a reverse direction (refer to FIG. 2 and FIG. 12) indicated with arrow Cr while having the trailing end 9*e* of the sheet 9 serving as the leading end with reversal rotation of the pair of transport rollers 744 at the reversal discharging path 54*b* (Step S120 in FIG. 11). In this case, the reversal path 54 (or the reversal discharging path 54*b* of the reversal path 54) serves as the transportation start portion of the sheet 9.

Thus, the sheet 9 is fed to the re-transport path 55 while being inverted. Thereafter, the inverted sheet 9 is transported to the final transport path 51 through the re-transport path 55.

Subsequently, when the inverted sheet 9 passes the final transport path 51, the controller 13 detects, with the misregistration detector 65, the deviation amount α of the sheet 9 in the axial direction D (Step S121).

Subsequently, the controller 13 determines whether the sheet 9 has a length held by the upstream pair of movable transport rollers 63 (Step S122).

Figure 11:
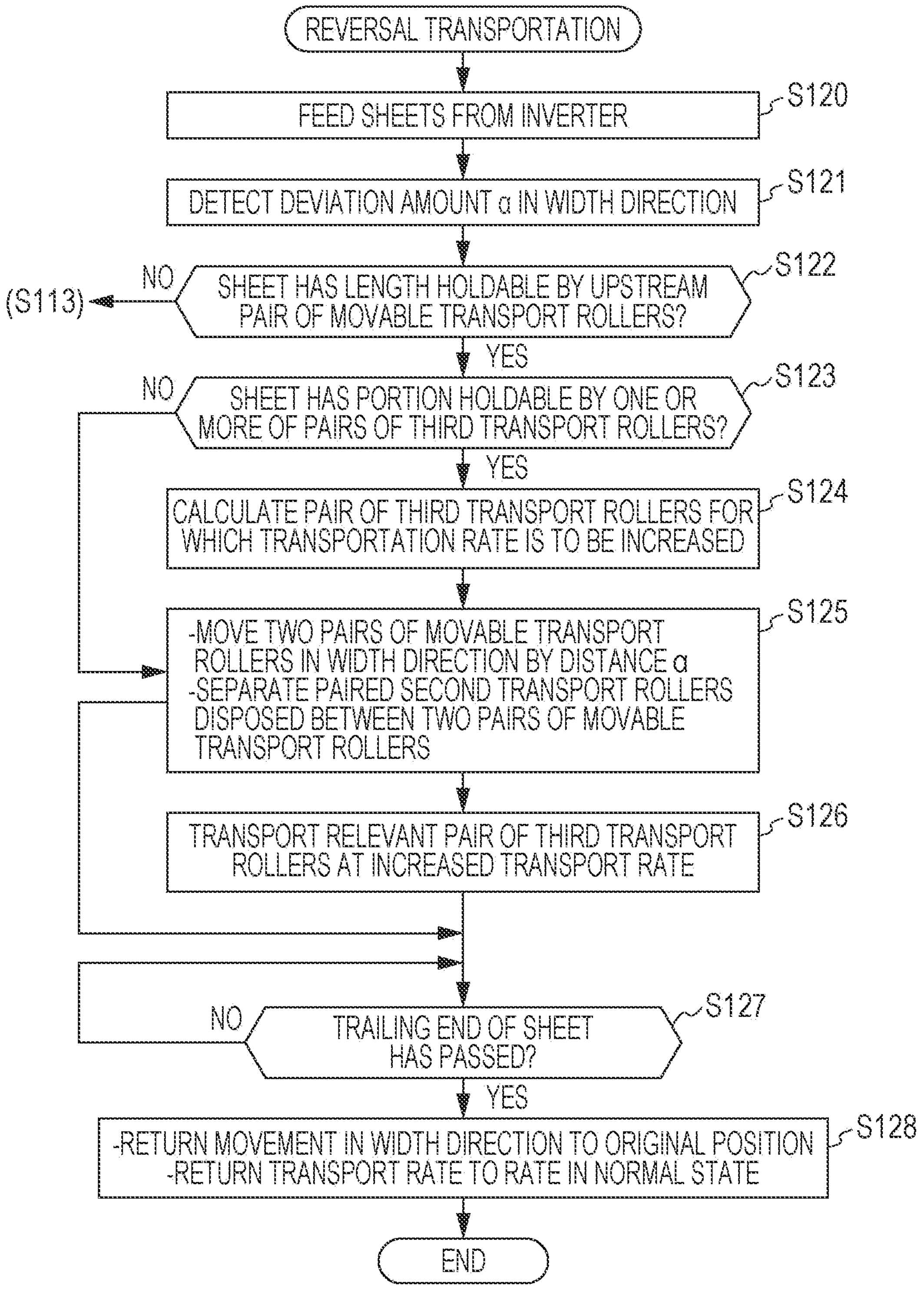
FIG. 11 is a flowchart of the transportation operation including reversal transportation.

When the controller 13 determines in Step S122 that the sheet 9 has a length held by the downstream pair of movable transport rollers 61, but not held by the upstream pair of movable transport rollers 63, the processing proceeds to Step S113 (refer to FIG. 8) as illustrated in FIG. 11.

In this case, the sheet 9 undergoes the transportation operation in Steps S113 to S118 illustrated in FIG. 8.

On the other hand, when the controller 13 determines in Step S122 that the sheet 9 has a length held by the upstream pair of movable transport rollers 63, the controller 13 determines whether the sheet 9 has a portion (trailing-end portion during transportation) held by one or more of the pairs of third transport rollers 751 to 757 (Step S123).

In Step S123, when the controller 13 determines that the sheet 9 has a portion held by one or more of the pairs of third transport rollers 751 to 757, the controller 13 calculates the pair of third transport rollers for which the transportation rate is to be increased (Step S124). At this time, the sheet 9 is a sheet with a large length to be held by the two pairs of movable transport rollers 61 and 63 and one or more of the pairs of third transport rollers 751 to 757.

Figure 13B:
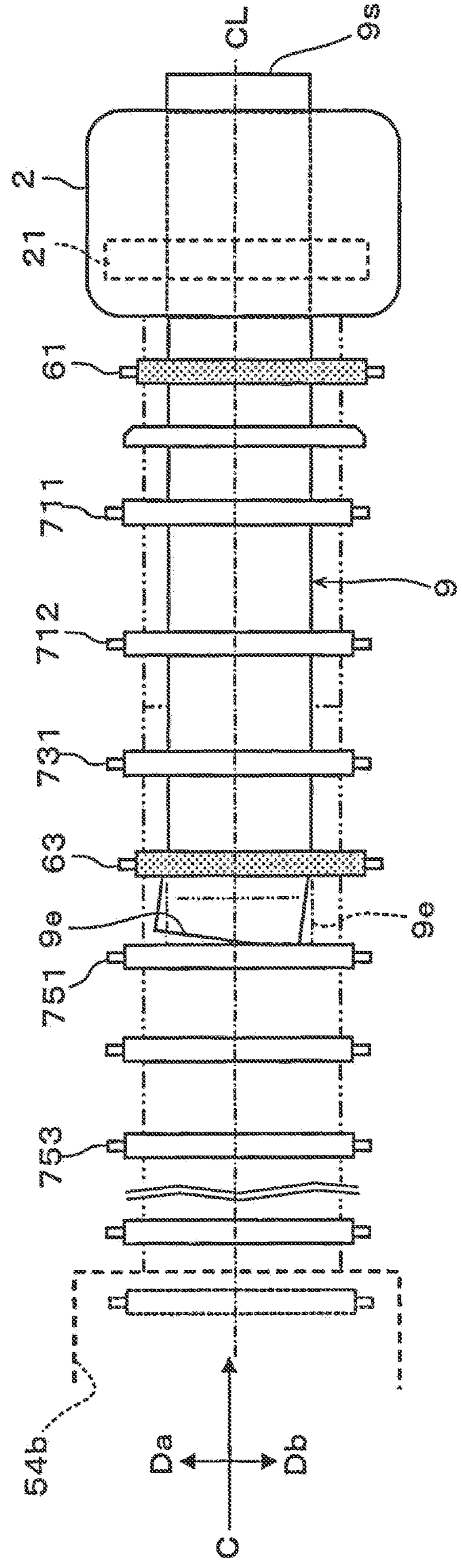
FIG. 13B is a diagram illustrating the state where a trailing end of the sheet in FIG. 13A passes through a most downstream one of the pairs of third transport rollers.

In the first exemplary embodiment, as described above, the sheet 9 is to be transported while being bent in the first section Eb1. Thus, the most downstream pair of third transport rollers 751 is calculated as the pair of third transport rollers for which the transportation rate is to be increased. FIG. 12 and FIGS. 13A and 13B illustrate a case where the sheet 9 has a portion held by the pairs of third transport rollers 751 to 753.

After the calculation in Step S124 is finished, the two pairs of movable transport rollers 61 and 63 are moved in the axial direction D by the intended distance α, and the paired second transport rollers 711, 712, and 731 disposed between the two pairs of movable transport rollers 61 and 63 are separated (Step S125).

The two pairs of movable transport rollers 61 and 63 are moved by the controller 13 controlling driving of the driving motors 617M and 637M in the moving device 637 through the roller-pair movement driving controller 502. The paired second transport rollers 711, 712, and 731 are separated by the controller 13 controlling driving of the driving motors 709M1, 709M2, and 709M3 in the separating device 708 through the roller-pair separation driving controller 503.

When the two pairs of movable transport rollers 61 and 63 are moved, the paired second transport rollers 711, 712, and 731 are separated.

Thus, the portion of the sheet 9 held by the two pairs of movable transport rollers 61 and 63 is no longer held by the pairs of second transport rollers 711, 712, and 731, and smoothly moved in the axial direction D with the moving operations of the two pairs of movable transport rollers 61 and 63.

Before the two pairs of movable transport rollers 61 and 63 start the moving operations, the transport rate of the most downstream pair of third transport rollers 751 to be increased is increased (Step S126), and the transportation operation at the sheet transport paths such as the re-transport path 55 and the final transport path 51 is restarted.

The transport rate is changed by the controller 13 controlling driving of a driving motor 707M6 in the re-transport path driver 550 via the transportation driving controller 501.

Thus, as illustrated in FIG. 12, the sheet 9 starts being transported while being bent in the first section Eb1.

At this time, the sheet 9 is transported while being bent in the first section Eb1, and is left easily movable to follow the movement of the pair of movable transport rollers 63.

As illustrated in FIG. 13A, at this time, a leading-end portion of the transported sheet 9 is fed by the downstream pair of movable transport rollers 61 while having the deviation in the axial direction D corrected, and fed to the image transfer portion 21 in the image forming portion 2.

As illustrated in FIG. 13B, at this time, when a trailing-end portion of the transported sheet 9 is released from the most downstream pair of third transport rollers 751 and passes therethrough, the trailing end 9*e* of the sheet 9 moves to the pair of movable transport rollers 63 while changing, in the first section Eb1, from the state slightly inclined with respect to the axial direction D as indicated with a solid line in FIG. 13B to the state having the deviation in the axial direction D corrected as indicated with a two-dot chain line in FIG. 13B.

Thus, after the center line Sc of the sheet 9 is substantially aligned with the transportation reference line CL, the sheet 9 is transported while having the trailing-end portion in transportation fed to the pair of movable transport rollers 63 deviated in the axial direction D, and then held and transported by the pair of movable transport rollers 61 deviated in the axial direction D.

The sheet 9 that has undergone such reversal transportation is finally transported from the final transport path 51 to the image forming portion 2.

Subsequently, after the transportation operation at the sheet transport path such as the first transport path 53 and the final transport path 51 is restarted, the controller 13 determines whether the trailing end 9*e* of the sheet 9 has passed through the pair of movable transport rollers 61 (Step S127).

In this case, the first passage sensor 59*a* detecting the trailing end 9*e* determines that the trailing end 9*e* of the sheet 9 has passed through the pair of movable transport rollers 61.

When the controller 13 determines in Step S123 that the sheet 9 has no portion held by one or more of the pairs of third transport rollers 751 to 757, as illustrated in FIG. 11, the processing proceeds to the operation in Step S125 instead of proceeding to the operation in Step S124.

In this case, after the operation in Step S125 is finished, as illustrated in FIG. 11, the processing proceeds to the operation in Step S127 instead of proceeding to the operation in Step S126.

When the controller 13 determines in Step 3127 that the trailing end 9*e* of the sheet 9 has passed through the pair of movable transport rollers 61, the controller 13 returns the two pairs of movable transport rollers 61 and 63 to the original position (the reference position in the normal state) before movement, returns the separate state of the pairs of second transport rollers 711, 712, and 731 to the contact state in the normal state, and returns the transport rate of the most downstream pair of third transport rollers 751 to the rate (V3) in the normal state (Step S128).

Thus, the sheet transport device 5 is prepared for the next transportation operation.

With the above operation, the sheet 9 that is inverted by undergoing reversal transportation has an image formed thereon by the image forming portion 2 on the back surface. The sheet 9 having an image formed on the back surface is transported through the discharging path 52, and finally accommodated in the discharging portion 11.

As described above, when moving the sheet 9 in the axial direction D with the pair of movable transport rollers 61 or the two pairs of movable transport rollers 61 and 63, the sheet transport device 5 reduces skewing or distortion of the portion of the sheet that is passing through, for example, all of or one or more of the multiple pairs of first transport rollers 711 and 712 or the pairs of third transport rollers 751 and 752 disposed upstream from the pairs of movable transport rollers 61 and 63.

More specifically, the sheet transport device 5 further reduces skewing or distortion of the portion of the transported sheet than in the case of transporting the sheet 9 without the multiple pairs of first transport rollers or the pairs of third transport rollers causing a difference in transport rate therebetween, or transporting the sheet 9 while pulling the sheet 9.

The sheet transport device 5 employs the first section Ea1 as the portion of the section Ea, and the first section Eb1 as the portion of the section Eb. Thus, the portion of the transported sheet 9 that is passing at least one of, for example, the pair of first transport rollers 711 and the pair of third transport rollers 751 is less easily skewed or distorted.

When the sheet transport device 5 moves the pair of movable transport rollers 61 or the two pairs of movable transport rollers 61 and 63 in the axial direction D, the image forming apparatus 1 including the sheet transport device 5 reduces skewing or distortion of the portion of the sheet 9 that is passing all of or one or more of, for example, the multiple pairs of first transport rollers 711 and 712 or the pairs of third transport rollers 751 to 757. Thus, the image forming apparatus 1 facilitates normal image formation on the sheet 9 at the image forming portion 2.

In the image forming apparatus 1, the sheet transport device 5 includes the re-transport path 55. Compared to the case where the sheet transport device 5 does not include the re-transport path 55, the sheet transport device 5 facilitates alignment of the position of an image formed by the image forming portion 2 on the back surface of the sheet 9 transported from the reversal path 54 serving as a sheet inverter with the position of an image formed on the front surface of the sheet 9 by the image forming portion 2.

Second Exemplary Embodiment

FIG. 14 to FIG. 19B illustrate, for example, a sheet transport device 5 according to a second exemplary embodiment.

As will be described below, the sheet transport device 5 according to the second exemplary embodiment and the sheet transport device 5 according to the first exemplary embodiment have the same structure except for a portion of the transportation operation.

Thus, in the following description and the drawings, the same components are denoted with the reference signs the same as those in the first exemplary embodiment without being described unless needed.

In the sheet transport device 5 according to the second exemplary embodiment, at least the most downstream pair of first transport rollers 711 among the pairs of first transport rollers 711 and 712 is a separable pair of rollers. In the second exemplary embodiment, as described in the first exemplary embodiment, the pairs of first transport rollers 711, 712, and 731 are separable pairs of rollers (refer to FIGS. 5A and 5B).

Figure 14:
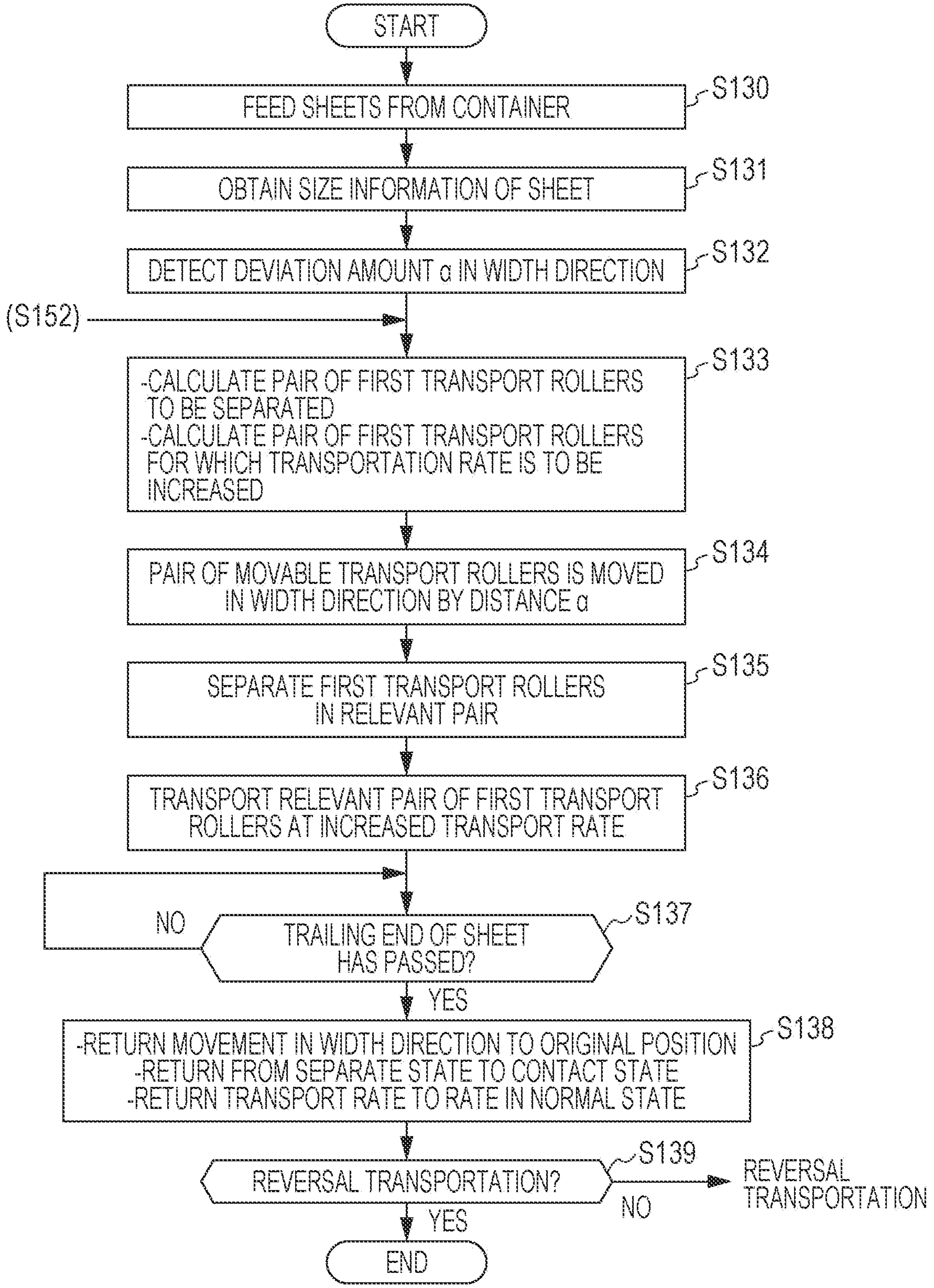
FIG. 14 is a flowchart of the transportation operation not including reversal transportation according to a second exemplary embodiment.
Figure 15:
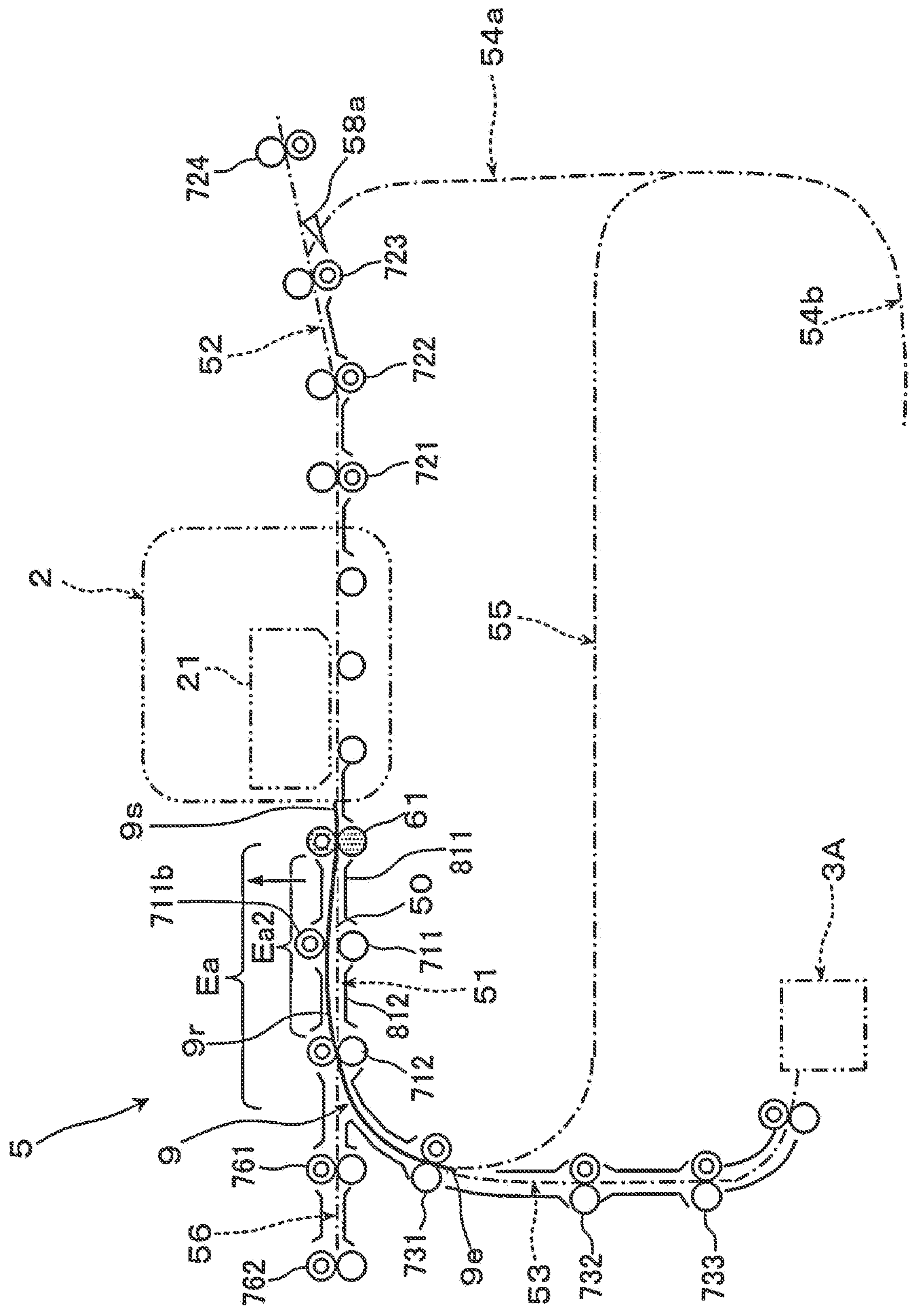
FIG. 15 is a schematic diagram of a related portion of the sheet transportation state corresponding to the transportation operation performed when a pair of movable transport rollers is moved.

As illustrated in FIG. 14 and FIG. 15, the portion of the section Ea in the sheet transport device 5 is changed to a second section Ea2. The second section Ea2 is a section located, when at least the first transport rollers 711 in the most downstream pair are separated, between the pair of movable transport rollers 61 and the most downstream pair of first transport rollers 711, and between the most downstream pair of first transport rollers 711 and the second-most downstream pair of first transport rollers 712 disposed immediately upstream of the pair of first transport rollers 711 in the transportation direction C.

In the sheet transport device 5 according to the second exemplary embodiment, at least the most downstream pair of third transport rollers 751 among the multiple pairs of third transport rollers 751 to 757 is a separable pair of rollers. In the second exemplary embodiment, as described in the first exemplary embodiment, at least the most downstream pair of third transport rollers 751 is a separable pair of rollers (refer to FIGS. 5A and 5B).

Figure 18:
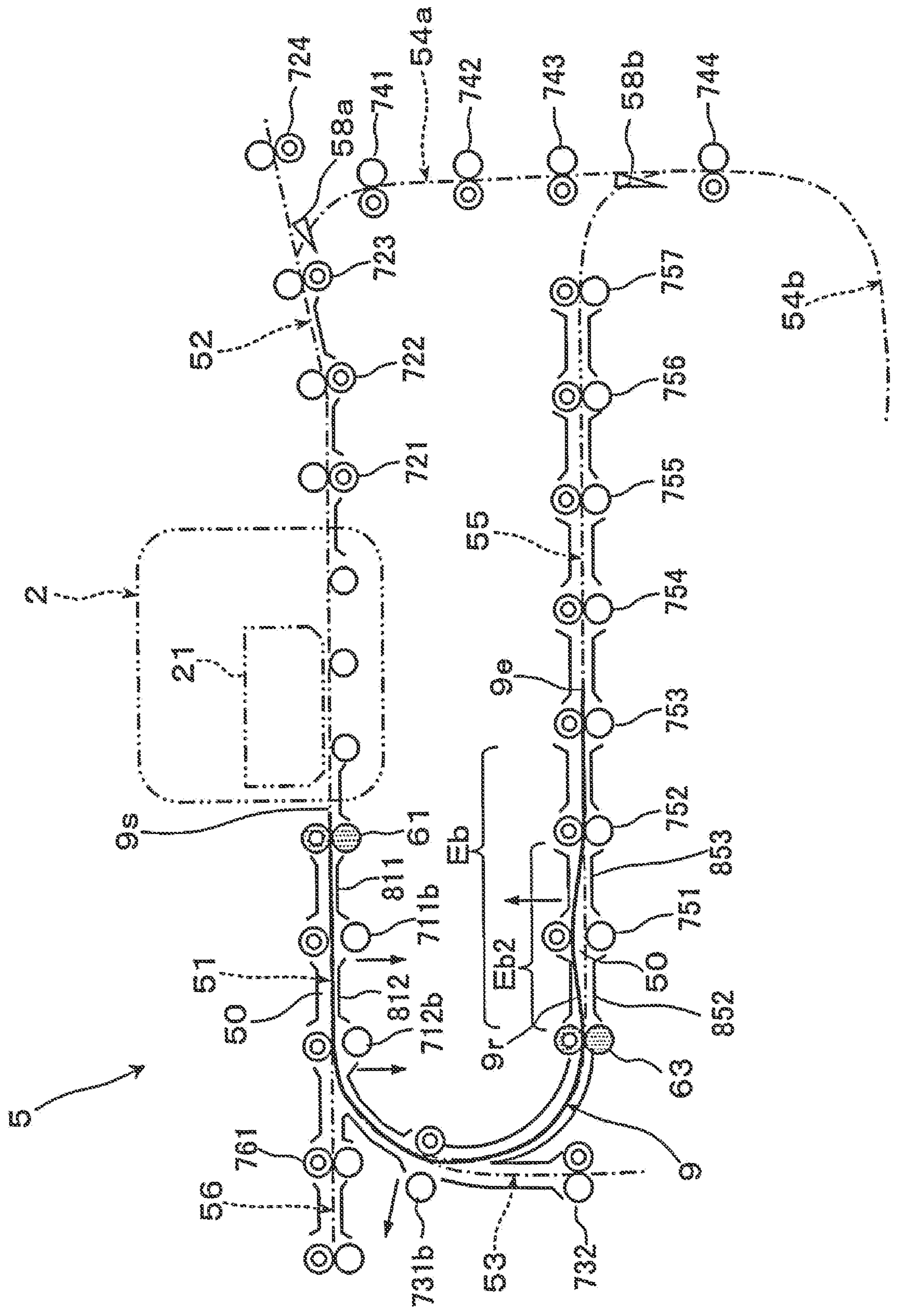
FIG. 18 is a schematic diagram of a related portion of the sheet transportation state corresponding to the transportation operation performed when two pairs of movable transport rollers according to the second exemplary embodiment are moved.
Figure 19A:
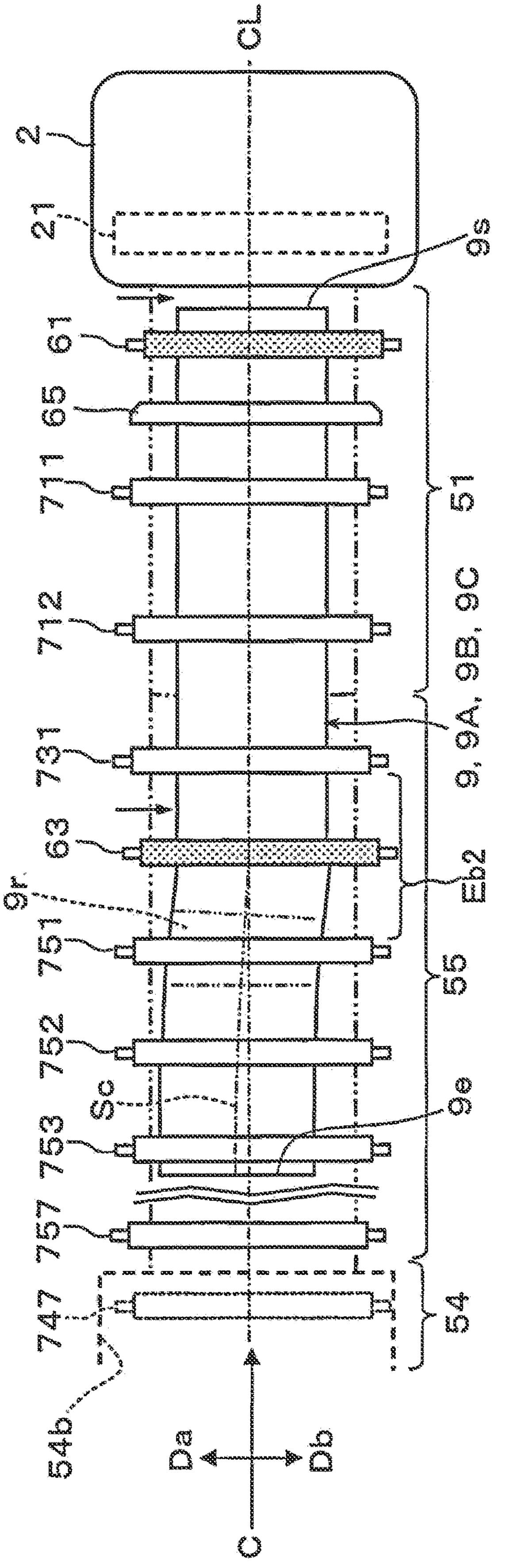
FIG. 19A is a diagram of the state of the sheet when undergoing the transportation operation in FIG. 18.
Figure 19B:
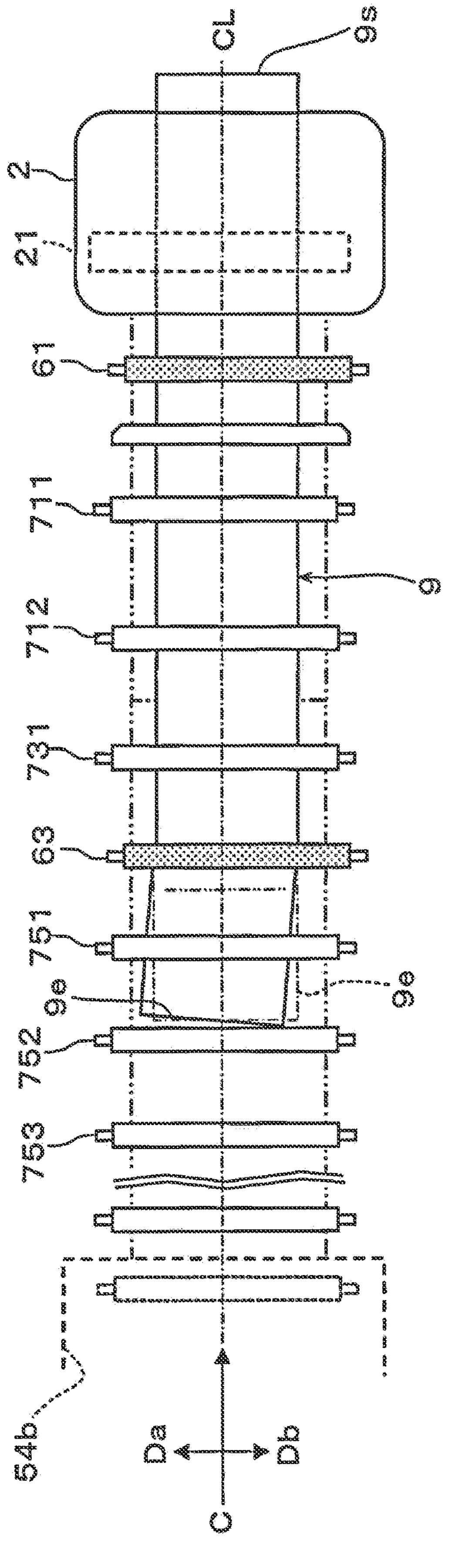
FIG. 19B is a diagram illustrating the state where a trailing end of the sheet in FIG. 19A passes through a second-most downstream one of the pairs of third transport rollers.

As illustrated in FIG. 18 and FIGS. 19A and 19B, in the sheet transport device 5, the portion of the section Eb is changed to the second section Eb2. The second section Eb2 is located, when at least the third transport rollers 751 in the most downstream pair are separated, between the upstream pair of movable transport rollers 63 and the most downstream pair of third transport rollers 751, and between the most downstream pair of third transport rollers 751 and the second-most downstream pair of third transport rollers 752 disposed immediately upstream from the pair of third transport rollers 751 in the transportation direction C.

Besides, the sheet transport device 5 preliminarily produces a difference in transport rate at the second section Ea2 with the transportation driving controller 501 performing a control to change the transport rate of the second-most downstream pair of third transport rollers 752 to a transport rate V2 (>V1) higher than the transport rate V1 in the normal state while keeping the transport rate of the pair of movable transport rollers 61 at the transport rate V1 in the normal state.

The sheet transport device 5 preliminarily produces a difference in transport rate at the second section Eb2 with the transportation driving controller 501 performing a control to change the transport rate of the second-most downstream pair of third transport rollers 752 to a transport rate V4 (>V3) higher than the transport rate V3 in the normal state while keeping the transport rate of the pair of movable transport rollers 63 at the transport rate V3 in the normal state.

The high transport rate V2 of the second-most downstream pair of first transport rollers 712 is set to allow the bent portion of the sheet to be kept away from the transport guides 811 and 812 disposed in the second section Ea2 or to allow the bent portion to slightly touch the transport guides 811 and 812. Similarly, the high transport rate V4 of the second-most downstream pair of third transport rollers 752 is set to allow the bent portion of the sheet to be kept away from the transport guides 852 disposed in the second section Eb2 or to allow the bent portion to slightly touch the transport guides 852.

Although the high transport rate V2 of the pair of first transport rollers 712 and the high transport rate V4 of the pair of third transport rollers 752 are the same, they may be different from each other.

Transportation Operation of Sheet Transport Device

Subsequently, a transportation operation performed by the sheet transport device 5 according to the second exemplary embodiment will be roughly described.

When the image forming apparatus 1 performs image formation, the sheet transport device 5 feeds the sheets 9 of the type and the size appropriate for the image formation from the sheet container of each transportation start portion 3 accommodating the sheets 9 (Step S130 in FIG. 14). As in the case of the first exemplary embodiment, the second exemplary embodiment describes a case where the sheets 9 (9A) are fed from the first feeder 3A for convenience.

The sheet 9 (9A) fed from the first feeder 3A is transported to the final transport path 51 through the first transport path 53. The sheet 9 illustrated in FIG. 15 and the following drawings is any of the sheets 9A, 9B, and 9C.

Subsequently, the controller 13 obtains size information of the sheet 9 (Step S131), and detects, with the misregistration detector 65, the deviation amount α of the sheet 9 in the axial direction D when the sheet 9 passes the final transport path 51 (Step S132). Until the result of the detection of the deviation amount α is produced, the transportation operation at the first transport path 53 and the final transport path 51 is temporarily stopped.

When the deviation amount α is detected, the controller 13 calculates the first transport rollers in the pair that are to be separated, and calculates the pair of first transport rollers for which the transport rate is to be increased (Step 3134).

In the second exemplary embodiment, as described above, the sheet 9 is to be transported in a bent state in the first section Ea1. Thus, the most downstream pair of first transport rollers 711 is calculated as the pair in which the rollers are to be separated, and the second-most downstream pair of first transport rollers 712 is calculated as the pair of first transport rollers for which the transport rate is to be increased.

In this case, the pair of movable transport rollers 61 is moved in the axial direction D by the intended distance α (Step S135).

Before or concurrently with the start of the movement operation of the pair of movable transport rollers 61, the paired first transport rollers 711 that are to be separated are separated (Step S135), and the transport rate of the pair of first transport rollers 712 that is to be increased is increased (Step S136).

The controller 13 performs the separation operation of the paired first transport rollers 711 by controlling driving of the driving motor 709M1 through the roller-pair separation driving controller 503.

After these operations are finished, the transportation operation at an appropriate sheet transport path such as the first transport path 53 or the final transport path 51 is restarted.

As illustrated in FIG. 15, thus, the sheet 9 starts being transported while being bent in the second section Ea2.

At this time, the sheet 9 is transported while being bent in the second section Ea2 longer (or wider) than the first section Ea1, and is left easily movable to follow the movement of the pair of movable transport rollers 61.

Figure 16A:
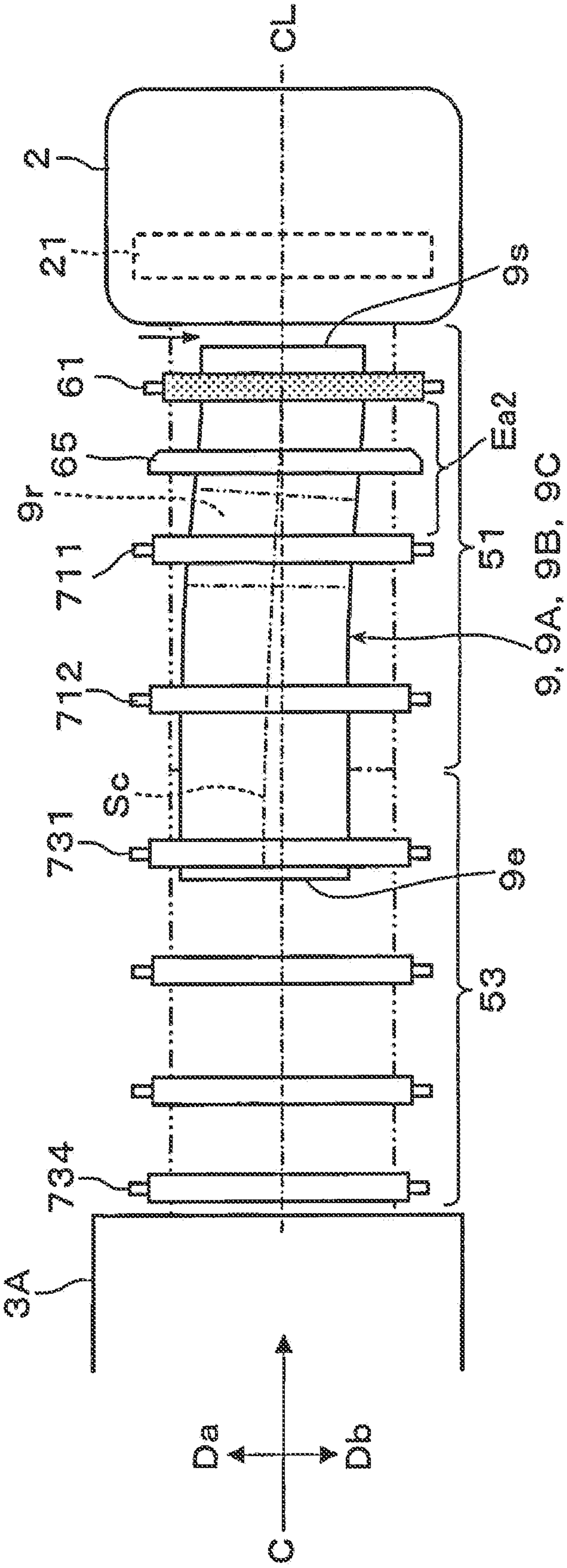
FIG. 16A is a diagram of the state of a sheet when the transportation operation in FIG. 15 is performed.

As illustrated in FIG. 16A, at this time, the leading-end portion of the transported sheet 9 is fed by the pair of movable transport rollers 61 while having a shift corrected in the axial direction D, and fed to the image transfer portion 21 in the image forming portion 2.

Figure 16B:
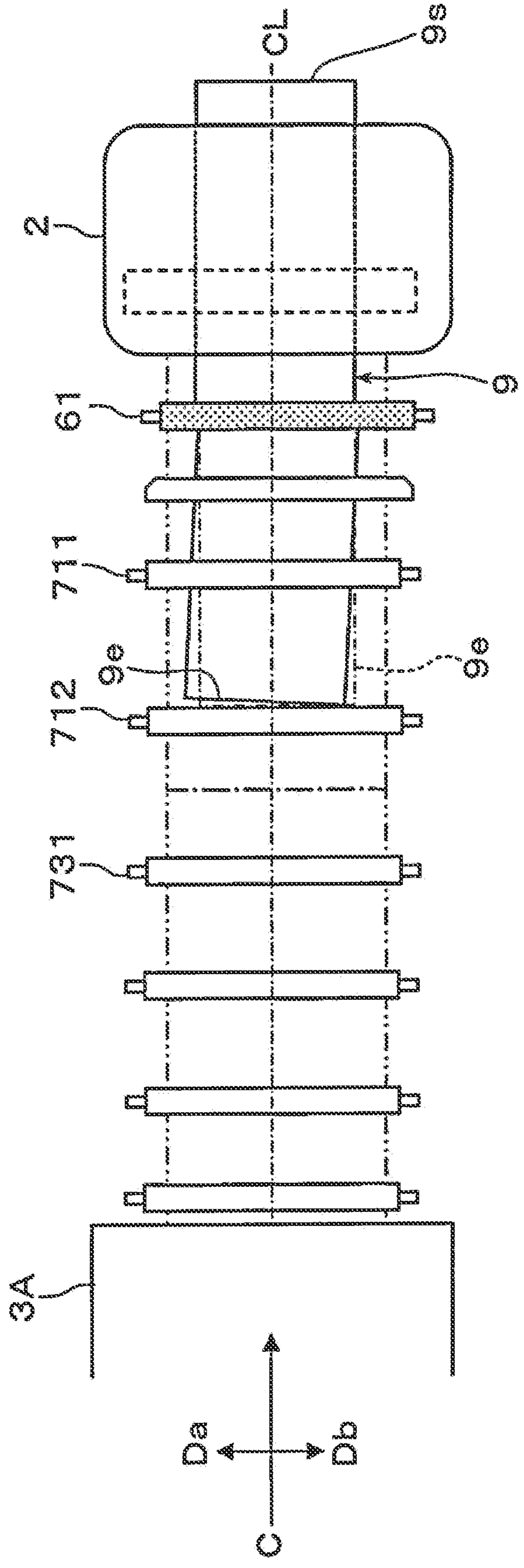
FIG. 16B is a diagram of the state where a trailing end of the sheet in FIG. 16A passes through a second-most downstream one of the pairs of first transport rollers.

As illustrated in FIG. 16B, when the trailing-end portion of the transported sheet 9 is released from the second-most downstream pair of first transport rollers 712 and passes therethrough, the trailing end 9*e* of the sheet 9 moves, in the second section Ea2, to the pair of movable transport rollers 61 from the state where the sheet 9 is slightly inclined with respect to the axial direction D as indicated with a solid line in FIG. 16B to the state where the deviation in the axial direction D is corrected as indicated with a two-dot chain line in FIG. 16B. In this case, the trailing-end portion of the transported sheet 9 including the trailing end 9*e* is movable without being restricted by the separated most downstream pair of first transport rollers 711.

Thus, after the center line Sc of the sheet 9 is substantially aligned with the transportation reference line CL, the sheet 9 is transported while the trailing-end portion of the transported sheet 9 is fed to the image forming portion 2.

Subsequently, after the transportation operation at, for example, the first transport path 53 and the final transport path 51 is restarted, the controller 13 determines whether the trailing end 9*e* of the sheet 9A has passed through the pair of movable transport rollers 61 (Step S137).

When the controller 13 has determined in Step S137 that the trailing end 9*e* of the sheet 9 has passed through the pair of movable transport rollers 61, the controller 13 returns the pair of movable transport rollers 61 to the original position (the reference position in the normal state) before the movement, returns the separate state of the most downstream pair of first transport rollers 711 to the contact state where the first transport rollers 711 are in contact with each other, and returns the transport rate of the second-most downstream pair of first transport rollers 712 to the rate (V1) in the normal state (Step S138).

Thus, the sheet transport device 5 is prepared for the next transportation operation.

Subsequently, the controller 13 determines whether the sheet 9 is to undergo reversal transportation (Step 3139).

When the controller 13 determines in Step S139 that the sheet 9 is not to undergo reversal transportation, the controller 13 finishes the transportation operation on the sheet 9.

In this case, the sheet 9 having an image formed on one side by the image forming portion 2 is transported through the discharging path 52, and finally accommodated in the discharging portion 11.

Transportation Operation Including Reversal Transportation

On the other hand, when the controller 13 determines in Step S139 that the sheet 9 is to undergo reversal transportation, the reversal transportation is successively performed.

In the reversal transportation, first, the sheet 9 having an image formed on one side while passing the image forming portion 2 is guided to the reversal path 54 by the destination switching member 58*a* at a portion of the discharging path 52.

Subsequently, the sheet 9 transported to the reversal path 54 is inverted by the pair of transport rollers 744 at the reversal discharging path 54*b*, and transported in the reverse direction (refer to FIG. 2 and FIG. 12) indicated with arrow Cr from the trailing end 9*e* (Step S150 in FIG. 17). In this case, the reversal path 54 (or the reversal discharging path 54*b* of the reversal path 54) serves as the transportation start portion for the sheet 9.

Thus, the sheet 9 is fed to the re-transport path 55 while being inverted. Thereafter, the inverted sheet 9 is transported to the final transport path 51 through the re-transport path 55.

Subsequently, when the inverted sheet 9 passes the final transport path 51, the controller 13 detects the deviation amount α of the sheet 9 in the axial direction D (Step S151).

Subsequently, the controller 13 determines whether the sheet 9 has a length held by the upstream pair of movable transport rollers 63 (Step S152).

Figure 17:
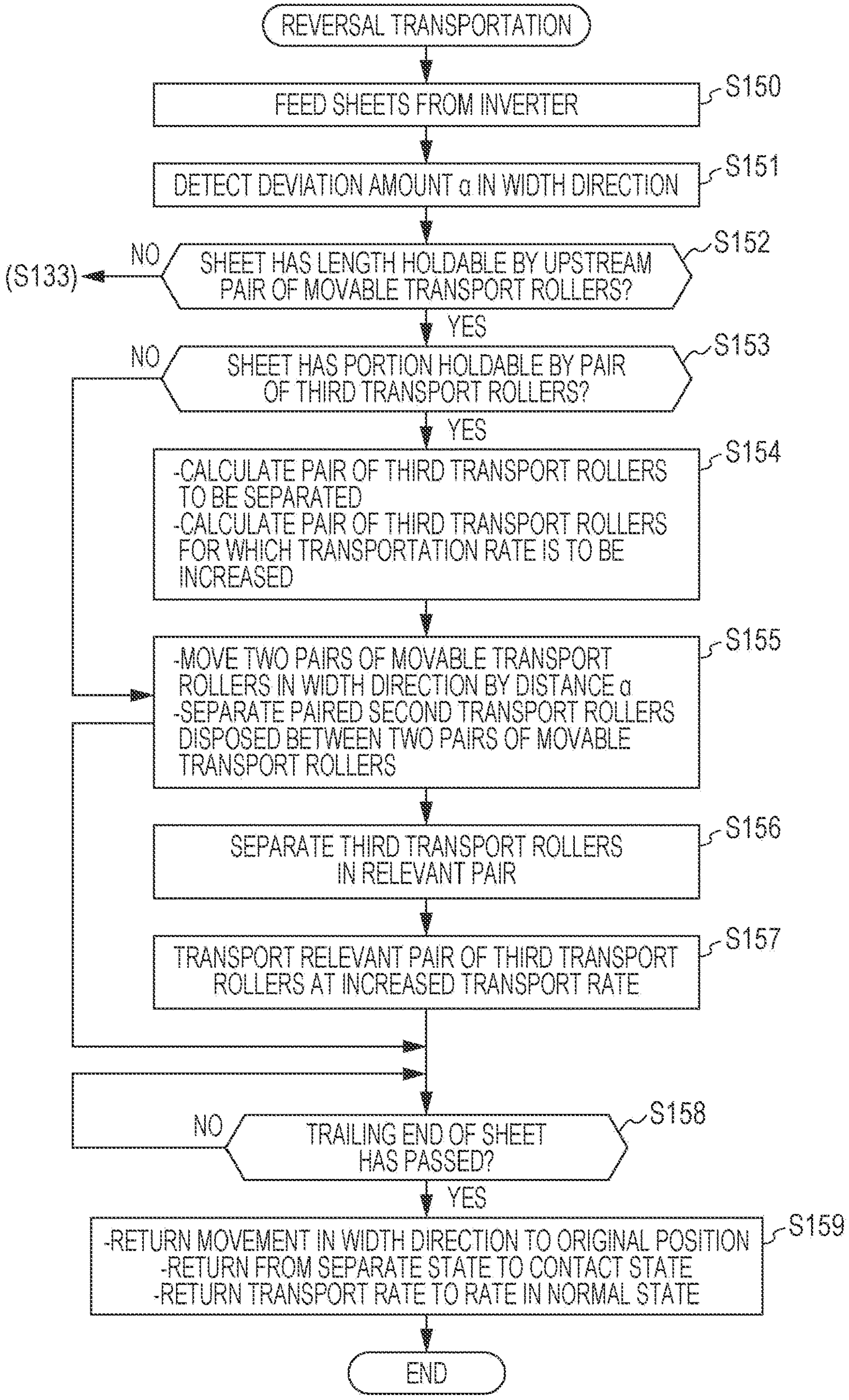
FIG. 17 is a flowchart of the transportation operation including reversal transportation.

When the controller 13 determines, in Step S152, that the sheet 9 has a length held by the downstream pair of movable transport rollers 61 but not held by the upstream pair of movable transport rollers 63, the processing proceeds to Step S133 (refer to FIG. 14) as illustrated in FIG. 17.

In this case, the sheet 9 is to undergo transportation operations in Steps S134 to S139 illustrated in FIG. 14.

On the other hand, when the controller 13 determines, in Step S152, that the sheet 9 has a length held by the upstream pair of movable transport rollers 63, the controller 13 determines whether the sheet 9 has a portion held by one or more of the pairs of third transport rollers 751 to 757 (Step 3153).

Also in this case, the sheet 9 is a long sheet as in the above case.

When the controller 13 determines in Step 3153 that the sheet 9 has a portion held by one or more of the pairs of third transport rollers 751 to 757, the controller 13 calculates the third transport rollers in the pair that are to be separated, and the pair of third transport rollers for which the transport rate is to be increased (Step 3154).

In the second exemplary embodiment, the sheet 9 is to be transported while being bent in the second section Ea2, as described above. Thus, the most downstream pair of third transport rollers 751 is calculated as the pair in which the rollers are to be separated, and the second-most downstream pair of third transport rollers 752 is calculated as the pair of third transport rollers for which the transport rate is to be increased.

After the calculation in Step S154 is finished, both the two pairs of movable transport rollers 61 and 63 are moved in the axial direction D by the intended distance α, and the paired second transport rollers 711, 712, and 731 disposed between the two pairs of movable transport rollers 61 and 63 are separated (Step S156).

Before or concurrently with the start of the movement operation of the two pairs of movable transport rollers 61 and 63, the third transport rollers 751 in the most downstream pair that are to be separated are separated (Step S156), and the transport rate of the second-most downstream pair of third transport rollers 752 that is to be increased is increased (Step S157).

After these operations, the transportation operation at an appropriate sheet transport path such as the re-transport path 55 and the final transport path 51 is restarted.

Thus, as illustrated in FIG. 18, the sheet 9 starts being transported in a bent state in the second section Ea2.

At this time, the sheet 9 transported in the bent state in the second section Ea2 longer (wider) than the first section Eb1 is left easily movable to follow the movement of the pair of movable transport rollers 63.

As illustrated in FIG. 19A, the sheet 9 at this time is fed to the image transfer portion 21 in the image forming portion 2 while the leading-end portion of the transported sheet 9 is fed with the deviation in the axial direction D corrected at the downstream pair of movable transport rollers 61.

As illustrated in FIG. 19B, when the trailing-end portion of the transported sheet 9 is released from the second-most downstream pair of third transport rollers 752 and passes therethrough, the trailing end 9*e* of the sheet 9 moves in the second section Eb2 to the pair of movable transport rollers 63 while being changed from the state slightly inclined with respect to the axial direction D as indicated with a solid line in FIG. 19B to the state where the deviation in the axial direction D is corrected as indicated with a two-dot chain line in FIG. 19B.

Thus, after the center line Sc of the sheet 9 is substantially aligned with the transportation reference line CL, the trailing-end portion of the sheet 9 is passed to the pair of movable transport rollers 63 located at the position deviated in the axial direction D, and the sheet 9 is then transported further while being held by the pair of movable transport rollers 61 located at the position deviated in the axial direction D.

The sheet 9 that has undergone such reversal transportation is transported to be finally fed from the final transport path 51 to the image forming portion 2.

Subsequently, after the transportation operation at sheet transport paths such as the re-transport path 55 and the final transport path 51 is restarted, the controller 13 determines whether the trailing end 9*e* of the sheet 9 has passed through the pair of movable transport rollers 61 (Step S158).

When the controller 13 determines in Step S153 that the sheet 9 does not have the portion held by one or more of the pairs of third transport rollers 751 to 757, as illustrated in FIG. 17, the processing proceeds to the operation in Step S155 instead of proceeding to the operation in Step 3154.

In this case, after the operation in Step S155 is finished, as illustrated in FIG. 17, the processing proceeds to the operation in Step S158 instead of proceeding to the operation in Step S156.

When the controller 13 determines in Step S158 that the trailing end 9*e* of the sheet 9 has passed through the pair of movable transport rollers 61, the controller 13 returns the pair of movable transport rollers 61 to the original position (the reference position in the normal state) before movement, returns the separate state of the most downstream pair of first transport rollers 711 to the contact state where the transport rollers 711 are in contact with each other, and returns the transport rate of the second-most downstream pair of first transport rollers 712 to the rate (V1) in the normal state (Step S159).

Thus, the sheet transport device 5 is prepared for the next transportation operation.

With the above operation, the image forming portion 2 forms an image on the back surface of the sheet 9 that is inverted after undergoing reversal transportation. The sheet 9 having an image formed on the back surface is transported through the discharging path 52, and finally accommodated in the discharging portion 11.

As described above, the sheet transport device 5 more easily obtains operation effects obtained by the sheet transport device 5 according to the first exemplary embodiment.

Specifically, the sheet transport device 5 transports the sheet 9 in the bent state in the transport space 50 while separating the first transport rollers 711 in the most downstream pair in the second section Ea2, and causing a difference in transport rate between the pair of movable transport rollers 61 and the second-most downstream pair of first transport rollers 712.

The sheet transport device 5 transports the sheet 9 in the bent state in the transport space 50 while separating the third transport rollers 751 in the most downstream pair in the second section Eb2, and causing a difference in transport rate between the upstream pair of movable transport rollers 63 and the second-most downstream pair of third transport rollers 752.

Thus, compared to the case where the most downstream pair of first transport rollers 711 is a pair of unseparable rollers and the portion of the section Ea is a section other than the second section Ea2, the sheet transport device 5 further reduces skewing or distortion of the portion of the transported sheet 9 passing through at least one of, for example, the pairs of first transport rollers 711 and 712.

Compared to the case where the most downstream pair of third transport rollers 751 is a pair of unseparable rollers and the portion of the section Eb is a section other than the second section Eb2, the sheet transport device 5 further reduces skewing or distortion of the portion of the transported sheet 9 passing through at least one of, for example, the pairs of third transport rollers 751 and 752.

MODIFICATION EXAMPLES

The present disclosure is not limited to the structure examples described in each exemplary embodiment, and the exemplary embodiments may be changed or combined as appropriate within the scope not departing from the gist of the present disclosure described in the scope of claims. The present disclosure includes, for example, modification examples described below.

The sheet transport device 5 may include, as a pair of movable transport rollers, only the pair of movable transport rollers 61 without the upstream pair of movable transport rollers 63. More specifically, for example, the sheet transport device may eliminate a re-transport path.

The characteristics of the sheet transport path such as the number or the form may be other than those described in the first and second exemplary embodiments.

The first and second exemplary embodiments have described a case where the three pairs of transport rollers 711, 712, and 731 are disposed as the pairs of first transport rollers disposed between the two pairs of movable transport rollers 61 and 63. Instead of three pairs, one or more pairs of first transport rollers may be disposed between the two pairs of movable transport rollers 61 and 63.

Instead of the center registration system described in the first and second exemplary embodiments, the sheet may be transported with another reference, for example, with a side registration system. The transportation operation with the side registration system is performed by setting one of the left and right edges of the final transport path 51 in the axial direction D as an edge transportation reference line, and aligning the left or right edge of the sheet 9 in the width direction with the edge transportation reference line.

When the sheet transport device 5 includes the two pairs of movable transport rollers 61 and 63, the upstream pair of movable transport rollers 63 may be disposed at the transport path other than the re-transport path 55. In the first and second exemplary embodiments, the upstream pair of movable transport rollers 63 may be disposed at the second transport path 56 or the third transport path 57.

In the sheet transport device 5, the pair of first transport rollers disposed upstream from the pair of movable transport rollers 61 in the transportation direction C is not limited to the pair of transport rollers disposed at the final transport path 51 and the first transport path 53. More specifically, the pair of first transport rollers may be a pair of transport rollers disposed at the final transport path 51 and the second transport path 56 or a pair of transport rollers disposed at the final transport path 51 and the third transport path 57.

When the sheet transport device 5 produces a difference in transport rate to transport the sheet 9 in a bent state, instead of controlling (adjusting the rotation rate of) the driving motor of the pair of transport rollers for which the transport rate is to be increased, for example, the transport rate of a driving transmission mechanism that transmits rotation power from the driving motor to the pair of transport rollers for which the transport rate is to be increased may be changed.

The difference in transport rate in this case may be caused by a method other than a method of changing the transport rate of the upstream pair of transport rollers located upstream in the transportation direction C to a transport rate higher than the transport rate of the downstream pair of transport rollers disposed immediately downstream from the pair of transport rollers. As long as causing no problem in the entire sheet transportation, the difference in transport rate may be produced by changing the transport rate of the downstream pair of transport rollers to a transport rate lower than the transport rate of the upstream pair of transport rollers.

In the first exemplary embodiment, the determination in Step S122 may be preliminarily determined by the controller 13 upon receipt of a command to perform the image forming operation. In this case, the determination in Step S122 may be eliminated.

In the second exemplary embodiment, the determinations in Steps S152 and S153 (FIG. 17) may be preliminarily determined by the controller 13 upon receipt of a command to perform the image forming operation. In this case, the determinations in Steps S152 and S153 may be eliminated.

The image forming portion 2 in the image forming apparatus 1 may be any portion capable of forming images on the sheet 9, and may have any form or other characteristics.

Thus, the image forming portion 2 may be of a form that, for example, sprays or transfers ink forming an image to the sheet 9. The type of the image is not limited to a particular one. The image may be, for example, of a type entirely formed on one or both surfaces of the sheet 9.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A sheet transport device, comprising:

a pair of movable transport rollers capable of transporting a sheet while holding the sheet and capable of moving in an axial direction crossing a transportation direction;

a plurality of pairs of first transport rollers disposed upstream from the pair of movable transport rollers in the transportation direction while being spaced apart from each other to transport the sheet while holding the sheet; and a plurality of pairs of transport guides disposed to define sheet transport spaces between the pair of movable transport rollers and the plurality of pairs of first transport rollers and between the plurality of pairs of first transport rollers, wherein, when the pair of movable transport rollers is to be moved in the axial direction, at least one of the plurality of pairs of first transport rollers transports the sheet while bending the sheet in the transport space by producing a difference in transport rate within a portion of a section upstream from the pair of movable transport rollers.

2. A sheet transport device, comprising:

two pairs of movable transport rollers capable of transporting a sheet while holding the sheet and capable of moving in an axial direction crossing a transportation direction, the two pairs of movable transport rollers being spaced apart from each other in the transportation direction;

one or more pairs of second transport rollers disposed between the two pairs of movable transport rollers to transport the sheet while holding the sheet;

a plurality of pairs of third transport rollers disposed upstream in the transportation direction from an upstream one of the two pairs of movable transport rollers disposed upstream in the transportation direction, while being spaced apart from each other, to transport the sheet while holding the sheet; and a plurality of pairs of transport guides disposed to define sheet transport spaces between the two pairs of movable transport rollers and between the plurality of pairs of third transport rollers, wherein, when the two pairs of movable transport rollers are to be moved in the axial direction, at least one of the plurality of pairs of third transport rollers transports the sheet while bending the sheet in the transport space by producing a difference in transport rate within a portion of a section upstream from the upstream pair of movable transport rollers.

3. The sheet transport device according to claim 1, wherein the portion of the section is a first section disposed between the pair of movable transport rollers and a most downstream one of the pairs of first transport rollers disposed immediately upstream from the pair of movable transport rollers.

4. The sheet transport device according to claim 2, wherein the portion of the section is a first section disposed between the upstream pair of movable transport rollers and a most downstream one of the pairs of third transport rollers disposed immediately upstream from the upstream pair of movable transport rollers.

5. The sheet transport device according to claim 1, wherein at least a most downstream one of the pairs of first transport rollers disposed immediately upstream from the pair of movable transport rollers is a separable pair of rollers, and wherein the portion of the section is a second section disposed, when at least the first transport rollers in the most downstream one of the pairs are separated, between the pair of movable transport rollers and the most downstream one of the pairs of first transport rollers, and between the most downstream one of the pairs of first transport rollers and a second-most downstream one of the pairs of first transport rollers disposed immediately upstream from the most downstream one of the pairs of first transport rollers.

6. The sheet transport device according to claim 2, wherein at least a most downstream one of the pairs of third transport rollers disposed immediately upstream from the pair of movable transport rollers is a separable pair of rollers, and wherein the portion of the section is a second section disposed, when at least the third transport rollers in the most downstream one of the pairs are separated, between the upstream pair of movable transport rollers and the most downstream one of the pairs of third transport rollers, and between the most downstream one of the pairs of third transport rollers and a second-most downstream one of the pairs of third transport rollers disposed immediately upstream from the most downstream one of the pairs of third transport rollers.

7. The sheet transport device according to claim 1, wherein a sheet transport path where the plurality of pairs of first transport rollers are disposed includes a bent section that is at least partially bent.

8. The sheet transport device according to claim 2, wherein a sheet transport path between the two pairs of movable transport rollers is bent.

9. The sheet transport device according to claim 8, wherein a sheet transport path where the plurality of pairs of third transport rollers are disposed is formed from a straight section that is a specific section extending straight from the upstream pair of movable transport rollers.

10. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 1.

11. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 3.

12. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 5.

13. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 7.

14. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 2.

15. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 4.

16. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 6.

17. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 8.

18. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 9.

19. The image forming apparatus according to claim 10, wherein the transportation start portion is a sheet inverter that inverts a sheet that has passed the image forming portion, and wherein at least part of the sheet transport device includes a re-transport path along which the sheet transported from the sheet inverter is re-transported to the image forming portion.

20. The image forming apparatus according to claim 14, wherein the transportation start portion is a sheet inverter that inverts a sheet that has passed the image forming portion, and wherein at least part of the sheet transport device includes a re-transport path along which the sheet transported from the sheet inverter is re-transported to the image forming portion.

* * * * *